(12) United States Patent
Heinsohn et al.

(10) Patent No.: US 12,539,634 B2
(45) Date of Patent: Feb. 3, 2026

(54) PIPE CUTTING DEVICE

(71) Applicant: KNIPEX-Werk C. Gustav Putsch KG, Wuppertal (DE)

(72) Inventors: Andreas Heinsohn, Wuppertal (DE); Christian Holz, Schwerte (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 236 days.

(21) Appl. No.: 18/272,394

(22) PCT Filed: Jan. 14, 2022

(86) PCT No.: PCT/EP2022/050745
§ 371 (c)(1),
(2) Date: Jul. 14, 2023

(87) PCT Pub. No.: WO2022/152845
PCT Pub. Date: Jul. 21, 2022

(65) Prior Publication Data
US 2024/0075643 A1    Mar. 7, 2024

(30) Foreign Application Priority Data
Jan. 15, 2021   (DE) ..................... 10 2021 100 767.4

(51) Int. Cl.
*B26D 3/16*      (2006.01)
*B23D 21/10*     (2006.01)

(52) U.S. Cl.
CPC .............. *B26D 3/169* (2013.01); *B23D 21/10* (2013.01)

(58) Field of Classification Search
CPC .......... B26D 3/169; B26D 3/16; B23D 21/06; B23D 21/08; B23D 21/10
See application file for complete search history.

(56) References Cited

U.S. PATENT DOCUMENTS

| | | | | |
|---|---|---|---|---|
| 1,505,205 A | * | 8/1924 | Kilgour, Jr. ............ | B23D 21/08 269/239 |
| 2,283,572 A | * | 5/1942 | Petersen ................ | B23D 21/08 30/102 |

(Continued)

FOREIGN PATENT DOCUMENTS

| | | | | |
|---|---|---|---|---|
| DE | 102009044012 A1 | * | 4/2010 | ............. B23D 21/08 |
| DE | 102018124817 A1 | * | 4/2020 | ............. B23D 21/06 |

(Continued)

OTHER PUBLICATIONS

International Search Report in PCT/EP2022/050745, mailed Jun. 20, 2022.

*Primary Examiner* — Jennifer S Matthews
(74) *Attorney, Agent, or Firm* — Collard & Roe, P.C.

(57) ABSTRACT

A pipe cutting device includes a cutting element, a counter-holder, and a C-shaped working head. The counter-holder is formed by the working head and the cutting element protrudes into a C-opening. The working head merges into a foot part and the cutting element is accommodated in a displacement part. The displacement part is movably arranged with the cutting element in an offset part and/or the counter-holder has rollers, and each two rollers are mounted in pairs on a rocker part. A further pipe cutting device has an offset part and a counter-holder which are formed on a C-shaped working head. The working head merges into a foot part which can also be used as a handle area, and the offset part can be offset relative to the foot part in order to change an opening width of the working head. In addition, the offset part has a cutting element.

15 Claims, 25 Drawing Sheets

(56) References Cited

U.S. PATENT DOCUMENTS

| | | | | |
|---|---|---|---|---|
| 2,875,518 | A | * | 3/1959 | Dyczynski ............ B23D 21/08 30/102 |
| 3,022,575 | A | | 2/1962 | Wright |
| 3,196,652 | A | * | 7/1965 | Meese ................... B23D 21/08 72/70 |
| 3,237,301 | A | * | 3/1966 | Wilson .................. B23D 21/08 30/102 |
| 3,403,442 | A | * | 10/1968 | Reese .................... C03B 33/14 30/164.95 |
| 6,189,216 | B1 | * | 2/2001 | Dureiko ................ B23D 29/00 30/97 |
| 6,226,823 | B1 | | 5/2001 | Ma Gee |
| 6,918,278 | B2 | * | 7/2005 | Dole ..................... B23D 21/08 72/107 |
| 9,308,660 | B2 | | 4/2016 | Macsay et al. |
| 11,571,755 | B2 | | 2/2023 | Heinsohn |
| 2002/0007514 | A1 | * | 1/2002 | Dole ...................... B23B 5/168 7/157 |
| 2010/0154223 | A1 | | 6/2010 | Chiu |
| 2022/0001470 | A1 | * | 1/2022 | Heinsohn .............. B23D 21/06 |

FOREIGN PATENT DOCUMENTS

| | | | | |
|---|---|---|---|---|
| GB | 1443622 | A | * 7/1976 | ............ B23D 21/10 |
| KR | 2000-0055279 | A | 9/2000 | |
| WO | WO-8900904 | A | * 2/1989 | ............ B23D 21/08 |

\* cited by examiner

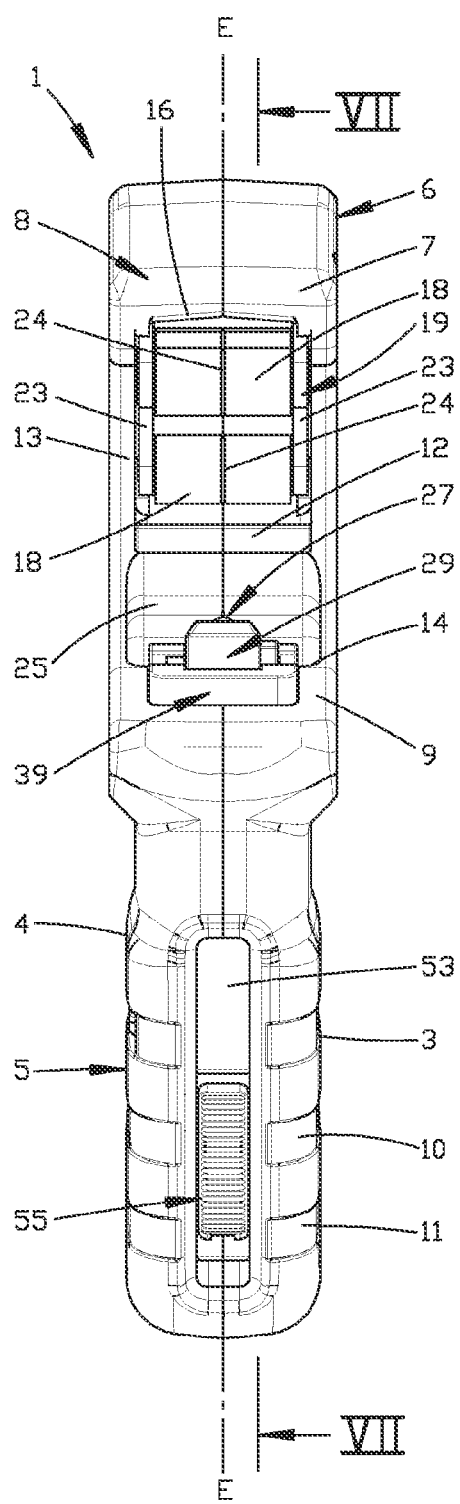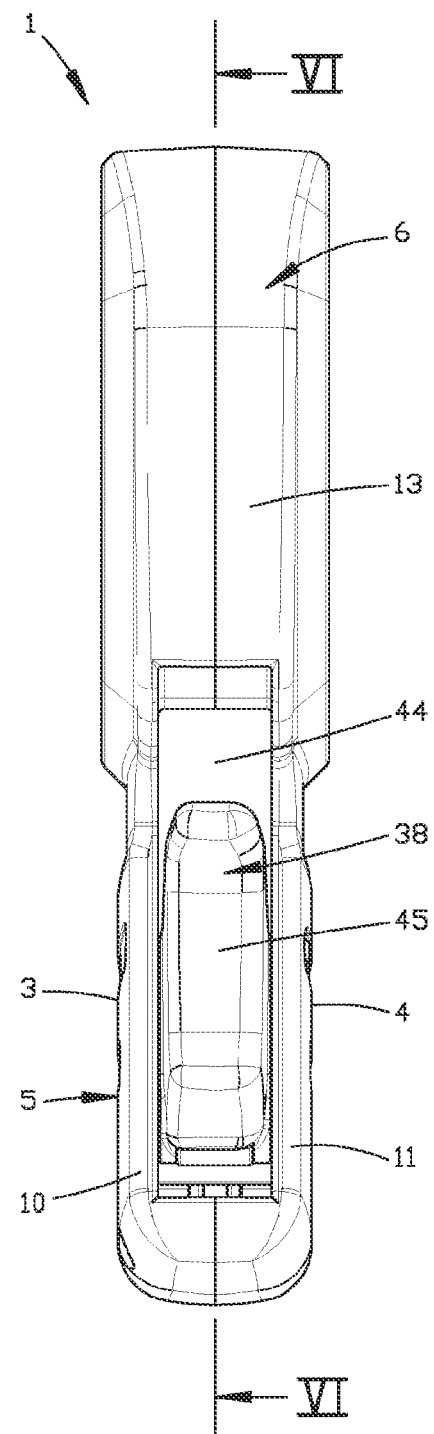

PIPE CUTTING DEVICE

CROSS REFERENCE TO RELATED APPLICATIONS

This application is the National Stage of PCT/EP2022/050745 filed on Jan. 14, 2022, which claims priority under 35 U.S.C. § 119 of German Application No. 10 2021 100 767.4 filed on Jan. 15, 2021, the disclosure of which is incorporated by reference. The international application under PCT article 21(2) was not published in English.

TECHNICAL FIELD

The invention pertains to a pipe cutting device with a cutting element, a counter-holder and a C-shaped working head, wherein the counter-holder is formed by the working head and the cutting element is designed to protrude into a C-opening, and wherein the working head furthermore transforms into a foot part, which can also be used as a handle area, and the cutting element is accommodated in a displacement part.

The invention also pertains to a pipe cutting device with a cutting element, a counter-holder and a C-shaped working head, wherein the counter-holder is formed by the working head and the cutting element is designed to protrude into a C-opening, and wherein the counter-holder furthermore comprises a roller, which has an outer roller surface and is rotatable about a roller shaft.

The invention furthermore pertains to a pipe cutting device with an offset part and a counter-holder, which are formed on a C-shaped working head, wherein the working head furthermore transforms into a foot part, which can also be used as a handle area, and the offset part can be offset relative to the foot part in order to change an opening width of the working head, and wherein the offset part comprises a cutting element.

PRIOR ART

Pipe cutting devices are known, in particular, from the plumbing industry and from pipeline construction. Such a pipe cutting device advantageously makes it possible to cut through a pipe section consisting, for example, of soft steel, V2A, cast iron, brass or even a thermoplastic polymer, preferably in a chipless manner, by producing a circular cut with at least one cutting knife that revolves, e.g., due to a rotation of the pipe cutting device. In this case, the active cutting element may be formed by a cutting wheel or a stationary cutting blade, wherein the cutting element furthermore is preferably hardened and consists, for example, of high-speed steel or optionally of a hard metal.

A pipe cutting device of this type is known, for example, from DE 10 2018 124 817 A1. The pipe cutting device described in this publication has the option of a rough adjustment by means of an offset part in order to roughly adjust the opening width between the cutting element and the counter-holder. Furthermore, U.S. Pat. No. 9,308,660 B2 discloses a pipe cutting device, in which the cutting element is accommodated in a displacement part and the cutting element can be displaced into a retracted position by means of the displacement part, e.g. in order to insert the pipe to be cut into the working head.

SUMMARY OF THE INVENTION

In light of the above-described prior art, the invention aims to additionally improve a pipe cutting device of the type in question.

According to a first inventive idea, this objective is potentially attained with a pipe cutting device, in which it is proposed that the displacement part with the cutting element is movably arranged in an offset part.

The above-described inventive design advantageously improves the handling of the pipe cutting device due to the option of an adaptation of the basic cutting element position within the C-opening of the working head in dependence on the diameter of the pipe section to be cut. This adaptation preferably takes place as a result of a corresponding offset of the offset part, in which offset part the cutting element with the displacement part preferably is arranged in a movable manner. As a result of this design, the cutting element furthermore can be displaced, for example, into a retracted position or from this retracted position into a cutting position by means of the displacement part in any offset position of the offset part. Furthermore, it is particularly preferred that the displacement of the cutting element into the retracted position can be caused deliberately by the user, e.g. for the purpose of inserting the pipe to be cut into the working head.

According to another inventive idea, the counter-holder may comprise rollers, wherein two rollers are respectively arranged in pairs on a rocker part.

This results in an advantageous alignment of the rollers in the counter-holder, wherein said alignment is adapted, in particular, to the diameter of the pipe section to be cut being inserted into the C-opening. Furthermore, the friction between the working head and the pipe section to be cut can be additionally reduced in the course of the cutting process due to the preferred arrangement of the rollers on a rocker part. In this context, it is preferred that the roller shafts and preferably also a geometric rocker axis of the rocker part, which is aligned parallel to the roller shafts, extend in a direction transverse to a direction of displacement of the displacement part accommodating the cutting element. In an embodiment of the pipe cutting device, in which two rollers are respectively provided on a rocker part, however, the displacement part does not necessarily have to be provided in combination, but rather is merely provided preferentially in this context. One roller or multiple rollers of the counter-holder can rest against the outer circumferential surface of the pipe to be cut in a supporting manner in the cutting position, i.e. when the pipe section is inserted into the C-opening of the working head.

According to another potential approach, it is proposed that the roller has a groove that extends circumferentially transverse to the roller shaft and interrupts the roller surface.

The formation of such a groove makes it possible to achieve fast, repeatable and precise positioning on the pipe to be cut. The groove may serve as a positioning aid in this case.

Furthermore, such a groove may also be advantageous in the course of carrying out a cutting process, particularly when cutting plastic pipes. A chip that may be produced during such a cutting process can optionally be accommodated in the groove-like depression of the roller. The support of the item to be cut on the roller surface therefore is not impaired by such a chip.

According to another inventive idea, the above-defined objective is potentially attained in that the offset part can be offset along a curved path.

It is preferred that the offset part can be offset deliberately by the user, e.g. along a circular arc line with preferably constant radius, in order to adapt the cutting element position within the C-opening of the working head to the diameter of the pipe section to be cut by means of such an offset. Due to the curved path, the cutting element is always moved into an advantageous cutting position relative to the pipe to be cut irrespective of the offset position of the offset part and preferably irrespective of the diameter of the pipe to be cut. In this case, the curved path preferably is essentially directed toward the head region lying opposite of the opening of the working head beyond the cutting element.

According to another inventive idea, the above-defined objective may also be attained in that an offset element of the offset part is arranged in the handle area in a recessed manner.

The offset element allows an adaptation of the cutting element position within the C-opening of the working head to the diameter of the pipe to be cut. It is preferred that such an offset of the offset element can only be realized deliberately by the user, particularly by means of a purposeful actuation of a corresponding offset element. For example, such an offset element may be a lever that makes it possible to respectively assume or cancel a fixed position of the offset part. In order to prevent the fixed position of the offset part from being inadvertently canceled during the further actuation of the pipe cutting device in the course of a cutting process, the corresponding offset element is arranged in a recessed manner referred to the other operating surface or handle surface of the pipe cutting device, e.g. in the region of the foot part or the handle area. It is preferred that this offset element does not protrude beyond the handle area surface surrounding the offset element in any position, but at least in the position that makes it possible to cut a pipe. For example, the offset element may be seated in a housing pocket, the cross section of which is closed on three sides. In this way, a user can advantageously encompass the handle area, e.g. in order to rotate the pipe cutting device around a pipe to be cut, without thereby simultaneously actuating the offset element. In fact, the actuation of the offset element requires a separate manipulation by the user in the handle area.

The characteristics of the above-described independent claims are important individually, as well as in any combination with one another, wherein characteristics of one independent claim furthermore can be combined with the characteristics of another independent claim or with characteristics of multiple independent claims, as well as with only individual characteristics of one or more other independent claims.

For example, the invention may therefore disclose a pipe cutting device, the displacement part of which with the cutting element is movably arranged in an offset part, wherein the offset part can be offset along a curved path, wherein the counter-holder optionally comprises rollers and two rollers may be arranged in pairs on a rocker part, and wherein an offset element of the offset part furthermore may be optionally arranged in a recessed manner in the handle area.

Other characteristics of the invention are frequently described below, as well as in the description of the figures, in their preferred association with the object of claim 1 and/or claim 2 or with characteristics of other claims. However, they may also be important in association with only individual characteristics of claim 1 and/or claim 2 or the respective other claim or independently.

According to another preferred embodiment, the displacement part with the cutting element may be arranged in the offset part so as to be movable against a spring force. In this case, the spring force preferably acts in the direction of the functional position of the cutting element, i.e. into an extended position of the cutting element that is approximately directed toward the center of the C-opening of the working head, such that the cutting element preferably moves forward into this functional position automatically after a corresponding load on the displacement part accommodating the cutting element is canceled. For example, a correspondingly arranged spring may be a conventional cylindrical spring that preferably is supported on the offset part with one end and acts against the displacement part with the other end.

It would furthermore also be possible to provide two pairs of rollers in the counter-holder. In this case, each pair preferably can be arranged on a respective rocker part. The rollers or the pairs of rollers, as well as their rocker parts, may be arranged in the counter-holder essentially along the boundary wall of the opening formed by the C-opening. The geometric roller axes and preferably also the geometric rocker axes are aligned in the same direction. The geometric rocker axes are arranged in the C-shaped working head in a circumferentially offset manner. For example, a circumferential offset angle may lie between 60 degrees and 150 degrees and amount, for example, to approximately 90 degrees.

In a potential embodiment, in which the cutting element is realized in the form of a cutting wheel, the geometric roller axes and the geometric rocker axes preferably are aligned parallel to the wheel axis of the cutting element.

The offset element may also be arranged so as to be displaceable together with the offset part. Accordingly, an offset of the offset part for adapting the cutting element position to the diameter of the pipe to be cut also leads to a corresponding offset of the offset element acting upon the offset part. If applicable, the adjusted offset position or cutting element position may be indicated exclusively or additionally based on the position of the offset part, e.g. relative to the foot part of the pipe cutting device.

According to a preferred embodiment, the offset element can be fixed in two or more offset positions relative to the foot part of the pipe cutting device, but also relative to its working head, e.g. in as many as five or ten offset positions, preferably in three offset positions. This may result in a corresponding number of catch positions for the offset element.

It is furthermore preferred that the adjustment of the offset element is not dependent on the displacement of the displacement part with the cutting element.

It would furthermore be possible to provide a retraction lever, by means of which the cutting element can be moved out of the C-opening. The retraction lever preferably acts upon the displacement part indirectly or directly, wherein the displacement part with the cutting element preferably is displaced against a spring force upon the deliberate actuation of the retraction lever by the user.

According to a preferred embodiment, the retraction lever may be arranged essentially opposite of the offset element acting upon the offset part referred to the foot part of the pipe cutting device.

The displacement part carrying the cutting element preferably is also displaced when the offset part is offset. Furthermore, the retraction lever acting upon the displacement part may also be arranged so as to be displaceable together with the offset part.

According to another preferred embodiment, an actuating surface that can be acted upon by the retraction lever may be formed on the displacement part. A displacement of the displacement part together with the cutting element relative to the offset part can be realized, preferably against the force of the return spring, by correspondingly acting upon this actuating surface with the retraction lever. The retraction lever and the actuating surface are designed for interacting in a controlled manner such that, for example, a deliberate pivoting movement of the retraction lever by the user results in an essentially linear displacement of the displacement part into a retracted position of the cutting element.

For example, the actuating surface may furthermore act as a control cam that moves the displacement part with the cutting element back into a starting position as the spring relaxes. In this case, the actuating surface of the control cam furthermore may extend in a direction transverse to the direction of displacement of the displacement part, e.g. in an arcuate manner, in order to interact with the retraction lever.

The starting position of the displacement part with the cutting element preferably is the stop-limited position in the relaxing direction of the spring acting upon the displacement part.

In a preferred embodiment, the displacement part is designed so as to extend in a curved manner in the adjusting direction of the offset part. As a result of this design, the displacement part with the cutting element can be respectively displaced into the retracted position of the cutting element or into the starting position in the offset part in accordance with the line of curvature, along which the offset part can be offset. In the starting position, the cutting element protrudes on the face beyond the offset part in the direction of the line of curvature, if applicable with a section of the displacement part. A potential displacement of the cutting element relative to the offset part may accordingly also take place along the line of curvature.

The retraction lever may upon its actuation act upon a respective actuating surface of the displacement part with two lever limbs that are spaced apart from one another. The lever limbs preferably are spaced apart from one another in the direction of a geometric axis, about which the retraction lever preferably is pivotable during its actuation. It is furthermore preferred that the retraction lever is hinged to the offset part. The hinge axis may be formed by a separately provided shaft body that is supported on the offset part.

In an enhancement of the invention, at least one lever limb may advantageously pass through a slot of the offset part. It is preferred that each lever limb passes through a separately formed slot in the offset part. In this way, an advantageous (lateral) guidance for the retraction lever is realized as a result of the interaction between lever limb and slot.

According to another advantageous embodiment, the cutting element is held by a linchpin that can only be removed by exerting pressure in the axial direction of the linchpin. A quick-change system for the cutting element is thereby realized.

It is preferred that such a change of the cutting element can only be carried out in the above-described starting position of the cutting element, in which the cutting element is exposed in the C-opening of the working head. An optional bore-like opening in the cutting element can serve for simplifying the removal of the cutting element after the linchpin has been removed, e.g. by inserting a removal tool through this opening.

The tool for removing the cutting element from the receptacle may be advantageously formed by the linchpin, particularly a section of the linchpin that was previously removed for the removal of the cutting element. Furthermore, a free end of the linchpin, e.g. an end facing away from the handling end, may be designed for being inserted into or through the opening of the cutting element. This end may furthermore be designed, for example, in a pin-like manner. The cutting element removal tool accordingly forms part of the pipe cutting device in such an embodiment. It is furthermore ensured that this linchpin has been removed as required for the removal of the cutting element prior to its use as a tool.

It is also preferred to provide the cutting element with two cutting regions that lie opposite of one another in the direction of the above-described line of curvature, wherein said cutting regions may be designed identically, but alternatively may also have different cutting geometries, e.g. for adapting the cutting element to the material of the pipe to be cut. The cutting element may be accommodated in the displacement part such that it can be rotated, for example, by 180 degrees.

The cutting element furthermore may be made of high-quality ball bearing steel.

According to another preferred embodiment, the rollers of the counter-holder may have a circumferential groove-like depression that is approximately arranged centrally in the direction of their axial extent. These groove-like depressions of all rollers preferably extend in a plane that preferably can define a common cutting plane together with the cutting element protruding into the C-opening. Fast, repeatable and precise positioning on the pipe to be cut is achieved with this embodiment due to the groove-like depressions, which are also provided as positioning aids. A user of the pipe cutting device advantageously can orient himself optically with respect to the cutting plane based on a groove-like depression even if the cutting element is already covered by an inserted pipe.

The width of a groove in the roller surface referred to the extending direction of the roller shaft may correspond to one eighth to one sixth, but at least to one twelfth and preferably to as much as one third, of a transverse dimension (diameter) of the roller.

To this effect, the groove furthermore may have a width that corresponds to one sixteenth to one twelfth, but at least to one twenty-fourth, of the roller length viewed in the axial direction.

The width may also correspond to 1.4-times or more and, for example, up to 2-times or more the groove depth viewed perpendicular thereto, wherein the groove depth furthermore may correspond, for example, to one twenty-fourth and up to one fifth, preferably to approximately one twelfth, of the roller diameter.

An absolute dimension for the groove width may amount, for example, to 1 to 2 mm or even more.

In a potential embodiment, the groove may be arranged eccentric referred to the extent of the roller in the axial direction. However, central positioning is preferred in this respect.

Furthermore, the groove preferably can be arranged in a common cutting plane together with the cutting tip of the cutting element. In this way, a user of the pipe cutting device advantageously can orient himself with respect to the cutting plane based on the groove-like depression, namely even if the cutting element is already covered by an inserted pipe.

In another potential embodiment, the roller may be designed in two parts viewed in the axial direction and comprise a first roller part 18' and a second roller part. Both roller parts may have identical axial lengths. However, roller parts with different lengths are also possible in this respect. It is furthermore preferred that both roller parts have the same diameter.

The two roller parts complement one another so as to form the roller in the operating state and may be loosely supported and held on a roller shaft.

With respect to their support on the roller shaft, the roller parts are acted upon in the direction toward one another, e.g.

by means of a spring force, such that the roller parts preferably abut on one another with their facing end faces.

An angular surface may be formed on one or both facing end faces in order to form the groove between the roller parts.

If the roller parts of the two-part roller are provided with a corresponding axial play, e.g. in order to remove a chip that has become stuck in the region of the groove, the roller parts can be moved apart from one another by a few tenths of a millimeter such that the resulting widening of the groove makes it possible to easily remove the chip from the groove.

This two-part design of the roller also makes it possible, if necessary, to place the roller parts on the roller shaft in such a way that the end faces provided with the angular surface point outward and no groove is formed centrally between the roller parts, but rather a continuous roller surface with constant diameter.

The pipe cutting device may be provided with multiple rollers, wherein only one or multiple rollers, preferably all rollers, may be provided with a groove. If multiple rollers are provided with a groove, the grooves preferably are, with respect to a cutting plane, arranged in alignment with one another in a common plane, but may for this purpose also be arranged in a separate groove plane in a parallel offset manner.

BRIEF DESCRIPTION OF THE DRAWINGS

The invention is described in greater detail below with reference to the attached drawings that, however, merely show exemplary embodiments. A component, which is described with reference to one of the exemplary embodiments and not replaced with a different component in another exemplary embodiment, is therefore also described as a potentially existing component in this other exemplary embodiment. In the respective drawings:

FIG. 3 shows a front view of the pipe cutting device;

FIG. 4 shows a rear view of the pipe cutting device;

DESCRIPTION OF THE EMBODIMENTS

Figure 1:
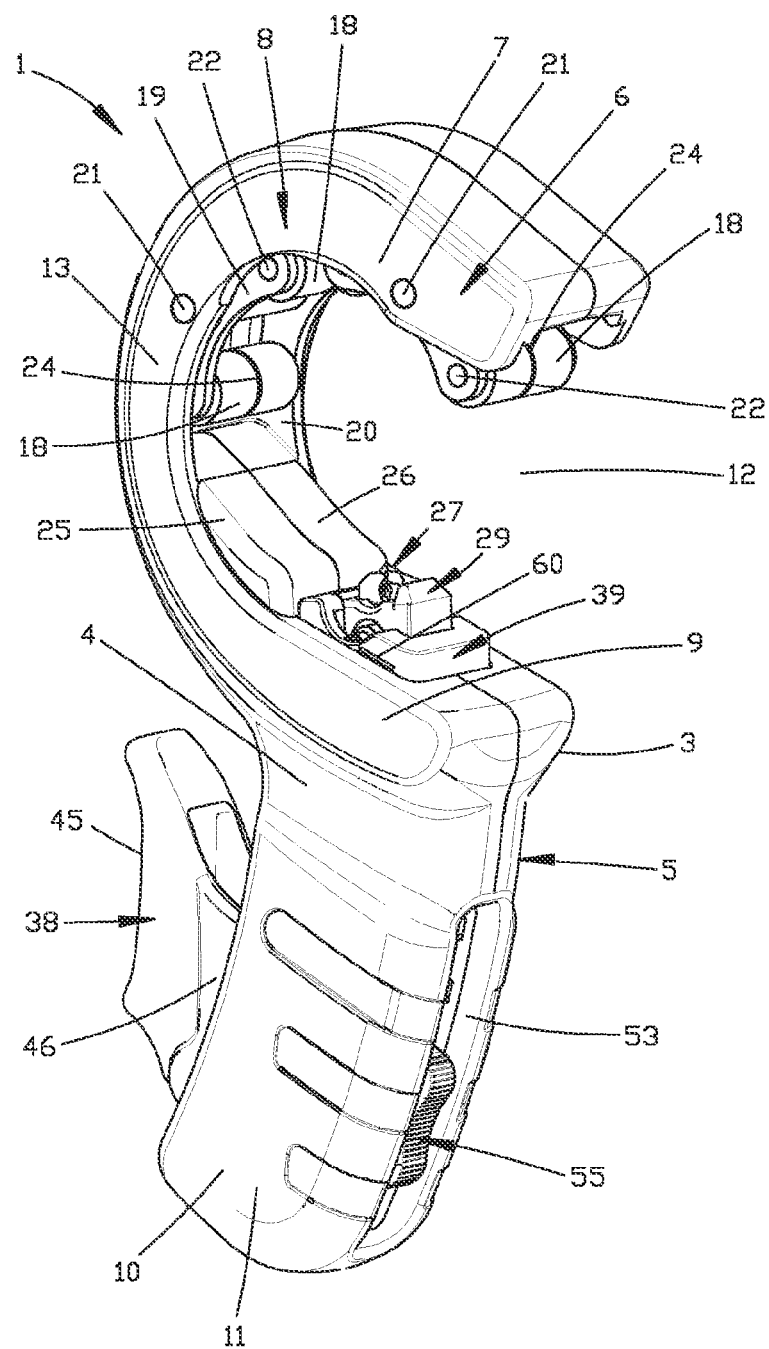
FIG. 1 shows a perspective view of a pipe cutting device concerning a first embodiment.

A pipe cutting device 1 for cutting to size pipe sections 2 is initially described with reference to FIG. 1.

The pipe cutting device 1 initially and essentially has a housing 5 consisting of a first housing shell 3 and a second housing shell 4. According to a preferred embodiment, the housing shells 3 and 4 may consist of a rigid plastic material, e.g. of a fiberglass-reinforced polyamide.

The housing 5 forms an essentially C-shaped working head 6, one C-limb 7 of which forms a counter-holder and the other C-limb of which transforms into a foot part 10, which essentially extends transverse to the C-opening 12 of the working head 6. The foot part 10 preferably can also be used as a handle area 11.

Figure 2:
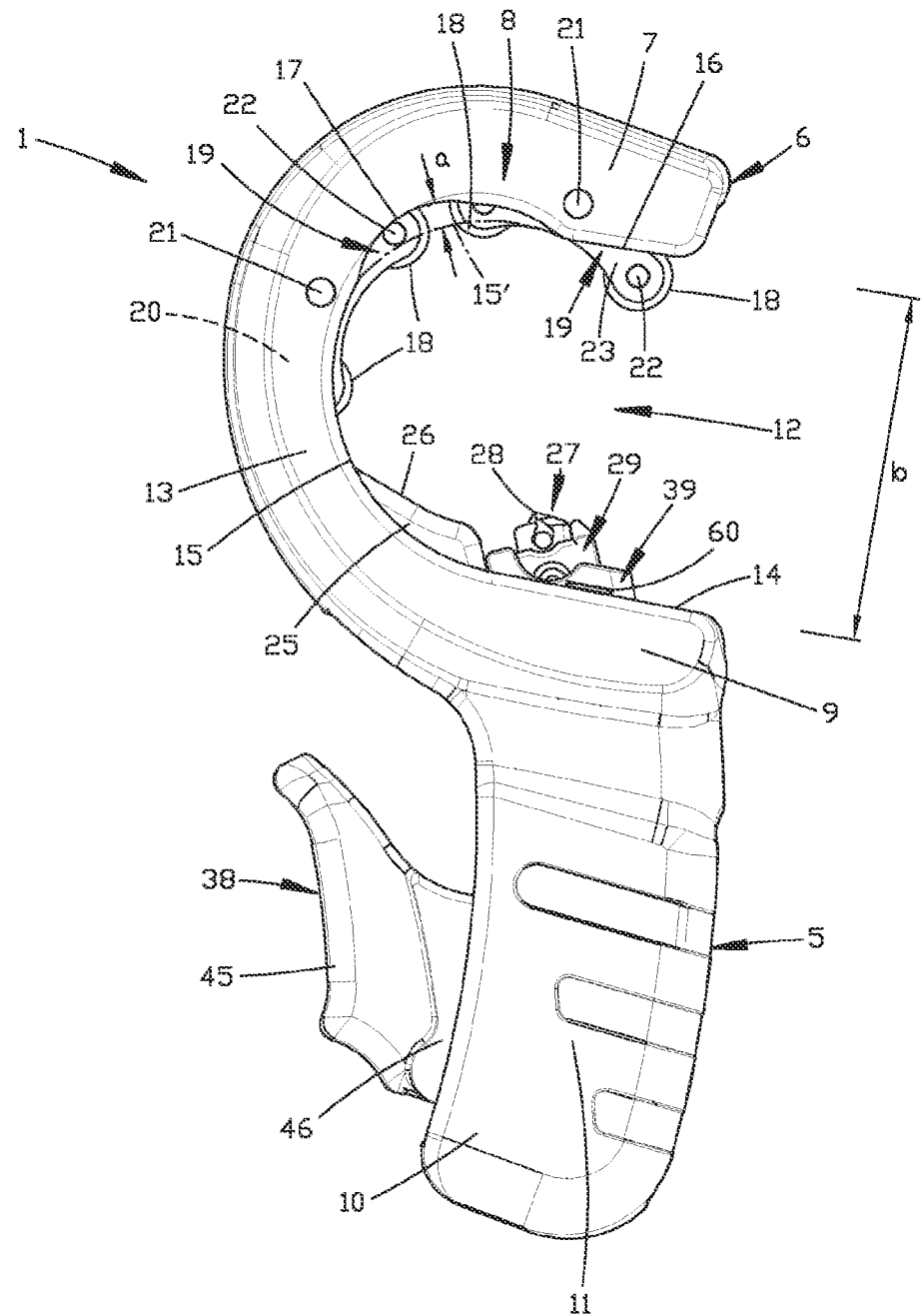
FIG. 2 shows a side view of the pipe cutting device.

With respect to a horizontal projection of the C-opening 12, e.g. according to FIG. 2, the C-crosspiece 13 connecting the C-limbs 7 and 9 is shaped so as to follow along an arcuate line extending over approximately 180°. According to the illustration in FIG. 2, for example, the limb wall 14 of the C-limb 9, which delimits the C-opening 12 and preferably extends in an essentially linear manner, furthermore can transform into a first crosspiece wall section 15 of the C-crosspiece 13, which approximately extends over 90 to 100 degrees, in an essentially tangential manner, wherein said crosspiece wall section is with respect to the boundary of the C-opening 12 approximately described by a constant or nearly constant radius over its entire extent.

The C-limb 7 forming the counter-holder 8 has a limb wall 16 that delimits the C-opening 12 and preferably extends in a linear manner, wherein said limb wall is aligned at least approximately parallel to the limb wall 14 of the opposite C-limb 9.

The first arcuate crosspiece wall section 15 is connected to the above-described limb wall 16 by means of a second arcuate crosspiece wall section 17. According to the illustration in FIG. 2, for example, this second crosspiece wall section 17 is set back relative to an imaginary extension 15' of the crosspiece wall section 15, which is illustrated with a dot-dash line in FIG. 2 and runs into the limb wall 16 in an approximately tangential manner, such that an expansion of the area of the C-opening 12 is achieved due to the chosen design of the second crosspiece wall section 17.

Different curvature radii may be chosen over the extent of the crosspiece wall section 17, wherein a first section that follows the crosspiece wall section 15 may have a smaller curvature radius than a terminal section that transforms into the limb wall 16.

In this case, a greatest expansion dimension a relative to the imaginary extension 15' of the crosspiece wall section 15 furthermore may be formed in the region of the crosspiece wall section 17, wherein said expansion dimension may amount, for example, to approximately one twelfth to approximately on eighth, furthermore to approximately one tenth, of the distance dimension b between the limb walls 14 and 16 (compare to FIG. 2).

The working head 6 is provided with rollers 18 that are assigned to the counter-holder 8. The rollers 18 preferably are arranged in pairs, wherein these rollers 18 may furthermore be held in a rocker part 19.

The rocker part 19 extends in a housing depression 20 that opens toward the C-opening 12, wherein the rocker part 19 is held in a pivotable manner between the housing shells 3 and 4 by means of a rocker shaft 21. The geometric axis of the rocker shaft 21 and the geometric axes of the roller shafts 22 are directed transverse to an inserting direction r of a pipe section 2 into the C-opening 12 and, according to a horizontal projection of the C-opening 12 of the type illustrated in FIG. 2, illustrated in the form of a point.

Figure 5:
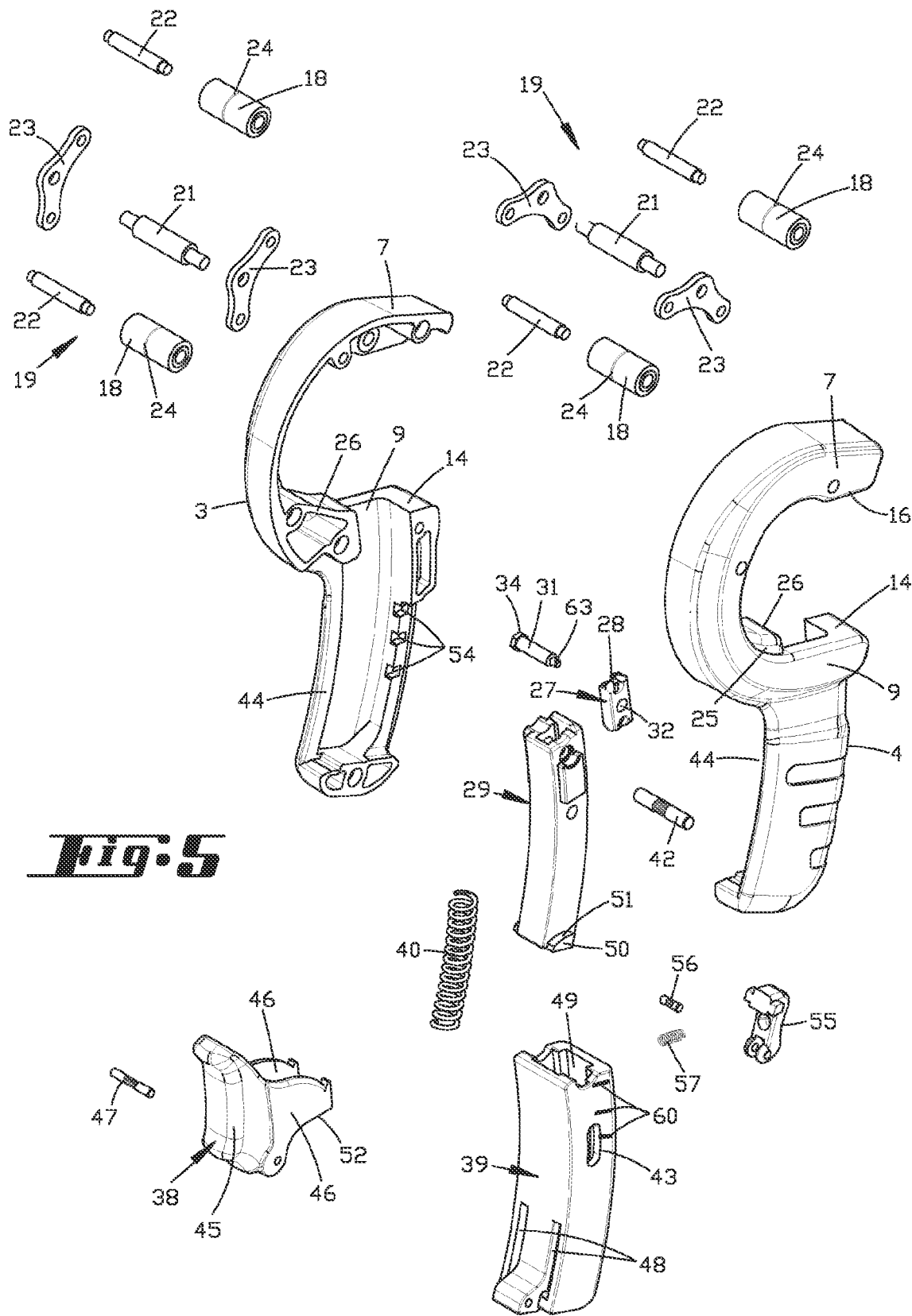
FIG. 5 shows an exploded perspective view of the pipe cutting device.

The illustration in FIG. 5, for example, furthermore shows that each rocker part 19 is provided with two tabs 23 that preferably are designed identically and aligned parallel to one another, wherein said tabs have tab limbs, which face away from the rocker shaft 21 on both sides and on the ends of which the roller shafts 22 are captured. In this case, both rollers 18 of a rocker part 19 preferably extend between the tabs 23 and are freely rotatable about their roller shafts 22.

Viewed in the extending direction of the roller shaft 22, each roller 18 preferably is provided with a central groove 24 that is recessed relative to the otherwise circular-cylindrical roller surface.

In a preferred embodiment, two rocker parts 19 are respectively provided with two rollers 18, wherein one rocker part 19 essentially is assigned to the C-limb 7 of the counter-holder 8 and the other rocker part 19 essentially is assigned to the C-crosspiece 13. Furthermore, the rocker shaft 21 of the one rocker part 19 may be arranged so as to be assigned to the transition region of the second crosspiece wall section 17 into the limb wall 16 whereas the rocker shaft 21 of the other rocker part 19 essentially may be arranged near the transition region of the first crosspiece wall section 15 into the second crosspiece wall section 17.

Due to the proposed housing depression 20, the rocker parts 19 with the rollers 18 can partially penetrate into the housing depression 20 as a result of a pivoting movement about the rocker shaft 21 such that a roller 18 can, referred to a horizontal projection according to FIG. 2, completely or partially moved behind the associated wall sections of the C-opening 12 or also partially or completely protrude beyond the associated wall in the direction of the C-opening 12.

The rocker parts 20 may be freely pivotable about their rocker shafts 21 as shown and their pivoting movement preferably is restricted by the base of the housing depression 20 only. According to a potential embodiment, it would also be possible that a spring, e.g. a leg spring, exerts a load upon the rocker part 19 in the direction of a normal position illustrated, for example, in FIG. 2. The insertion of the pipe section 2 to be cut is thereby additionally simplified.

According to the exemplary embodiment illustrated in FIGS. 1 to 24, it would furthermore be possible, for example, to provide a supporting block, which protrudes into the C-opening 12, in the transition region from the limb wall 14 on the side of the foot part into the adjacent crosspiece wall section 15, wherein said supporting block has a supporting surface 26 that is directed toward the C-opening 12.

Figure 25:
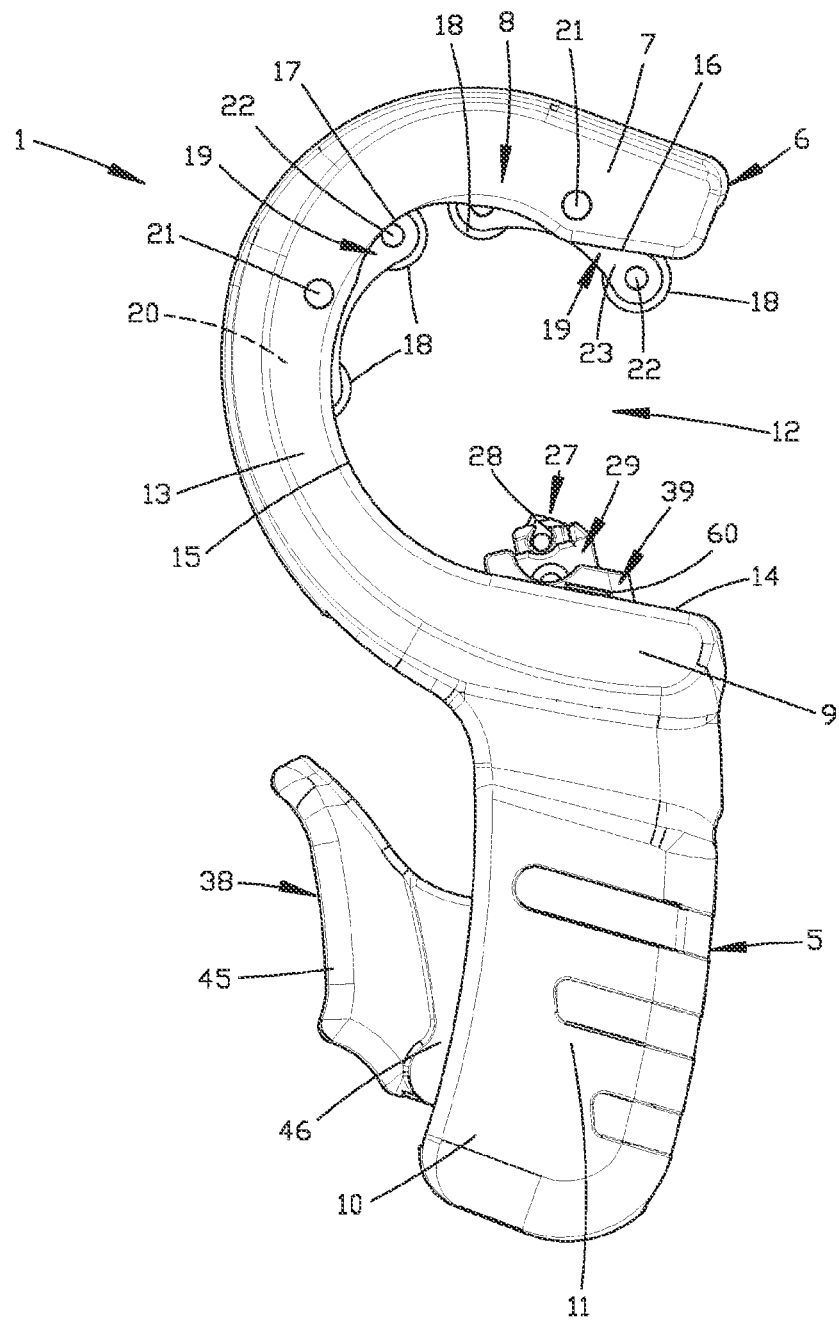
FIG. 25 shows the pipe cutting device in the form of a side view according to FIG. 2, but concerning a second embodiment.

According to the second embodiment illustrated in FIG. 25, the boundary contour of the C-opening 12 may alternatively also be formed by the limb walls 14 and 16 and the crosspiece wall sections 15 and 17 only, i.e. the above-described supporting block 25 is omitted in this embodiment.

In order to cut a pipe section 2 in the circumferential direction, the pipe cutting device 1 is provided with a cutting element 27 that freely protrudes into the C-opening 12 in a starting position, for example, according to FIG. 2, wherein said starting position corresponds to the cutting standby position.

Figure 9:
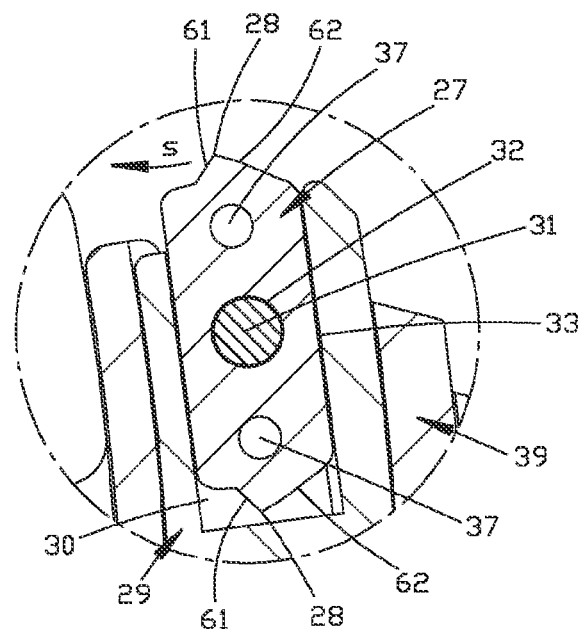
FIG. 9 shows an enlarged detail of the region IX in FIG. 6.
Figure 10:
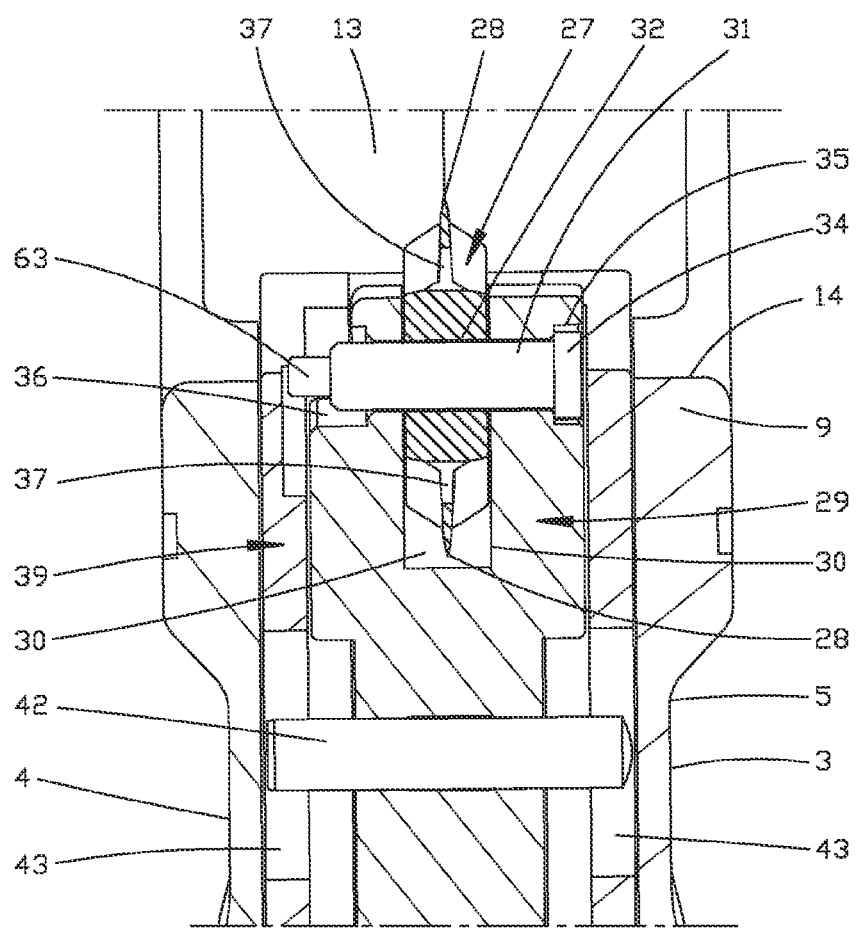
FIG. 10 shows the section along the line X-X in FIG. 7.
Figure 11:
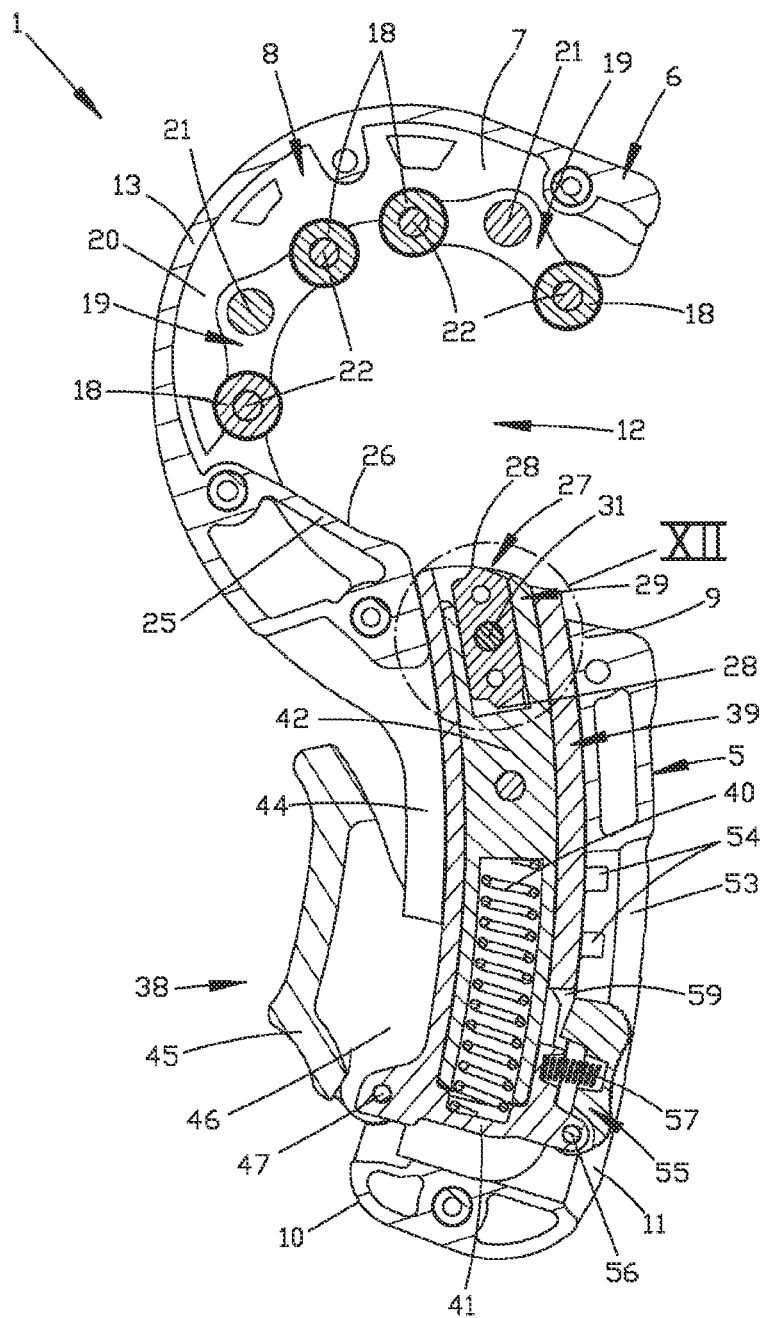
FIG. 11 shows a representation corresponding to FIG. 6, but concerning a retracted position of a cutting element of the pipe cutting device.
Figure 12:
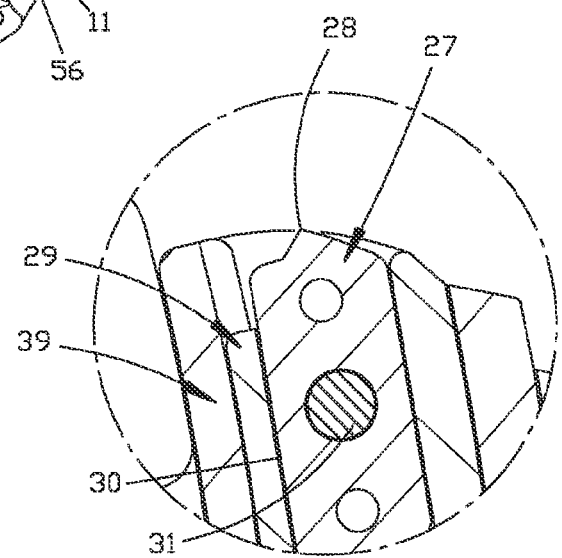
FIG. 12 shows an enlarged detail of the region XII in FIG. 11.
Figure 13:
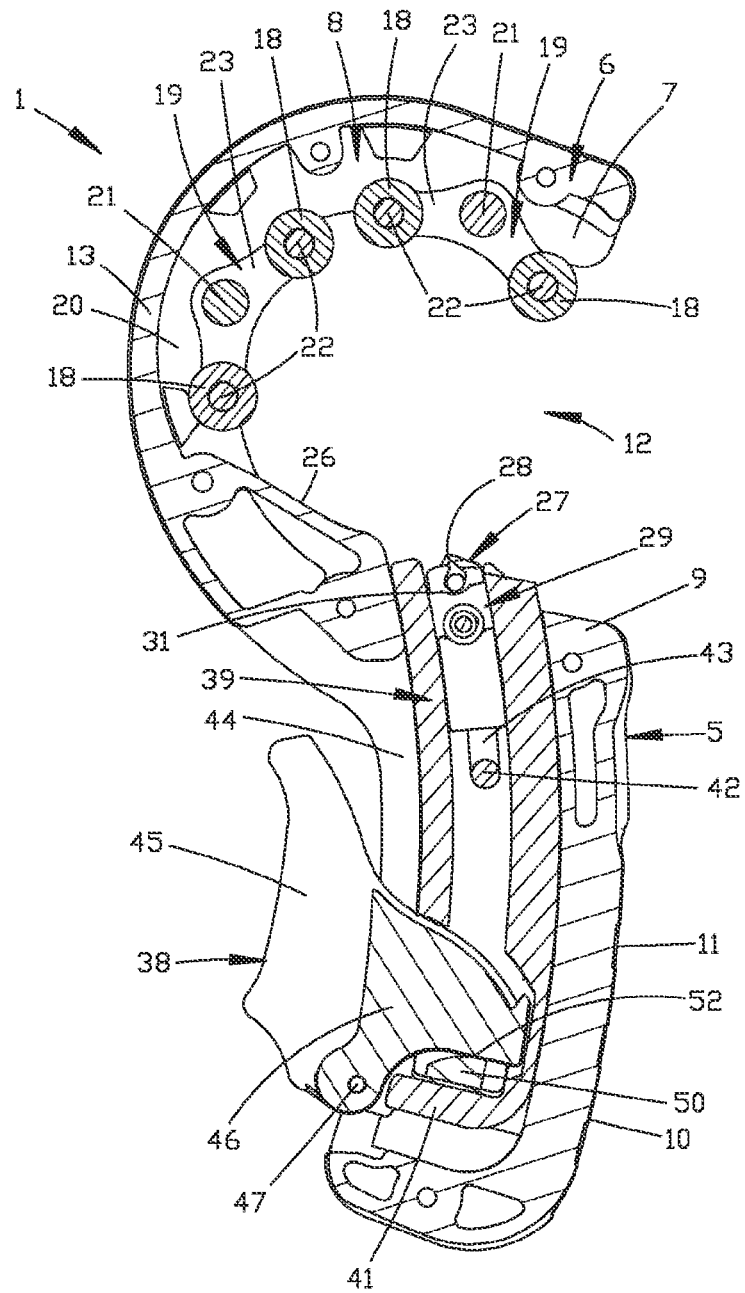
FIG. 13 shows a representation corresponding to FIG. 7, but concerning the position according to FIG. 11.
Figure 14:
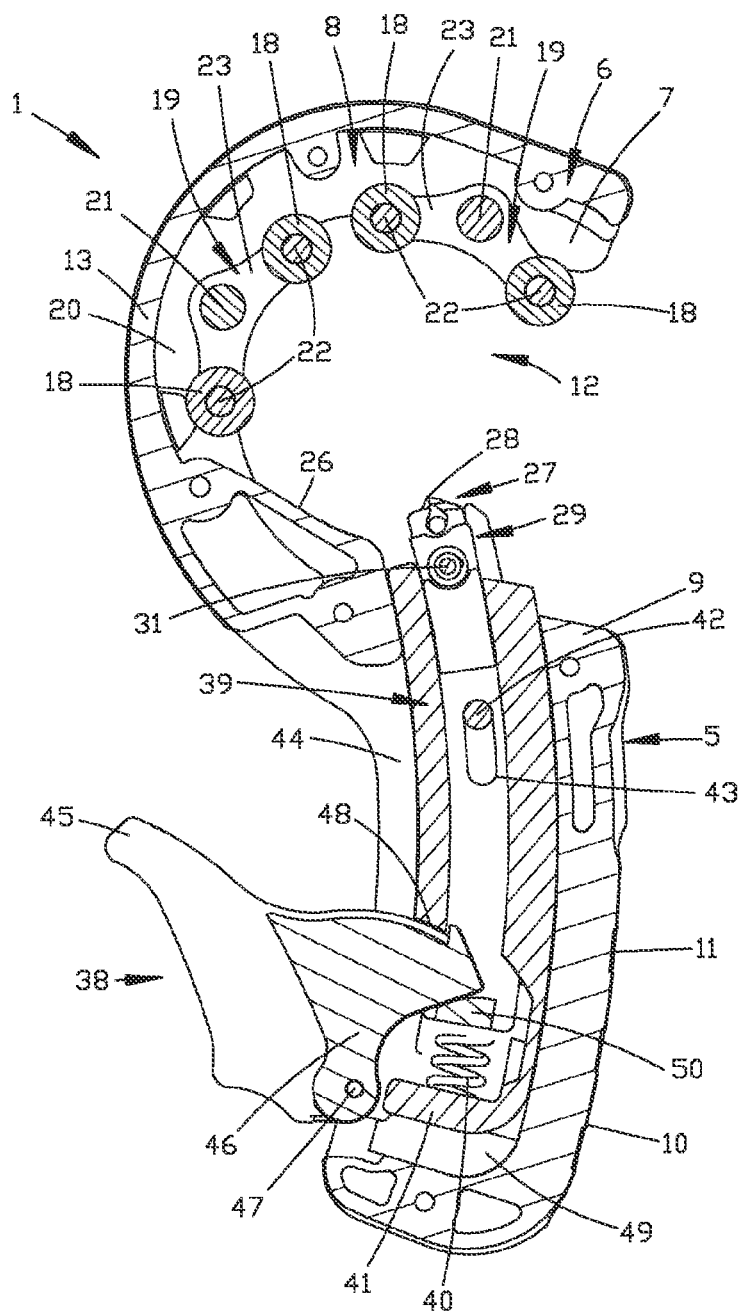
FIG. 14 shows a representation corresponding to FIG. 7 concerning a removal position for the cutting element.
Figure 15:
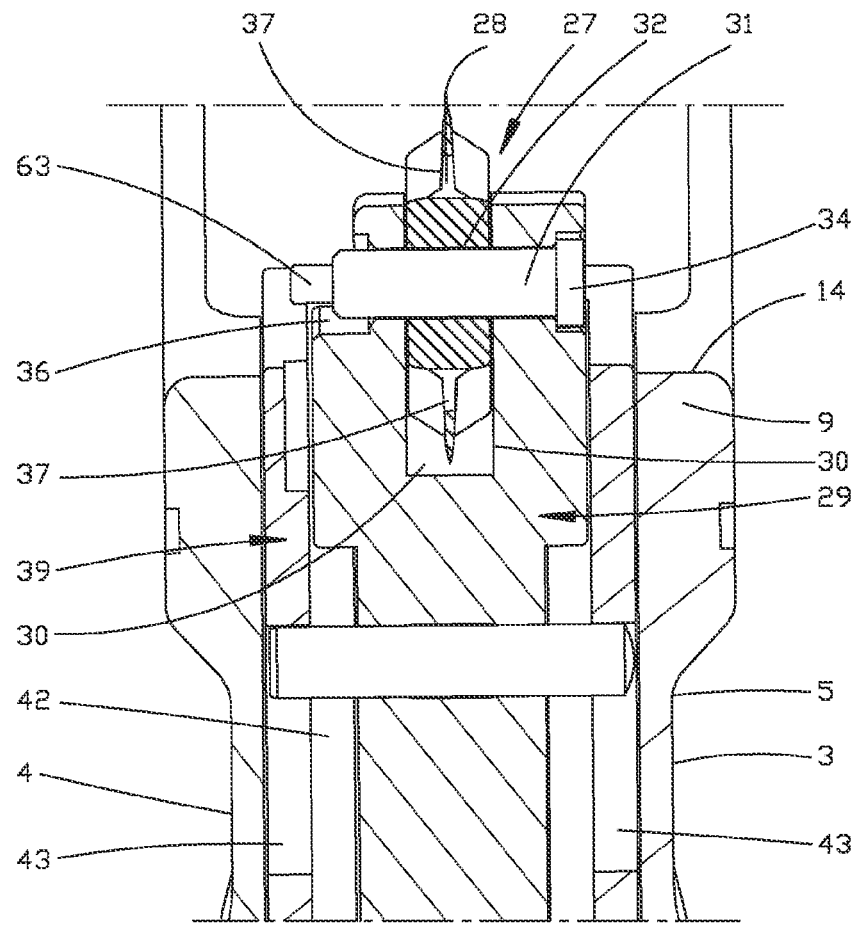
FIG. 15 shows the section along the line XV-XV in FIG. 14.

According to the illustration in FIG. 9, for example, the cutting element 27 essentially is realized in the form of a cutting blade, preferably in the form of a so-called reversing blade with cutting tips 28 that lie opposite of one another viewed in the longitudinal direction of the cutting element 27. The cutting tip 28 to be used can be changed, e.g. once a cutting tip 28 is worn out, by rotating and/or reversing the entire cutting element 27, preferably by 180 degrees.

According to the exemplary embodiment shown, both cutting tips 28 have the same cutting contour with a steep flank 61, which is directed in the cutting direction s, and an adjacent flat flank 62. This type of design of the cutting tip 28 is particularly advantageous for cutting plastic pipes, as well as domestic water pipes, wherein the chosen cutting tip design furthermore promotes clearing of the cutting kerf being formed.

Opposite sides of the cutting element 27 may alternatively also be realized with different blades, e.g. in order to cut pipe sections consisting of different materials.

The cutting element 27 preferably can be mounted in a displacement part 29 by means of a pin. To this end, the displacement part 29 has a receptacle 30 in the region of the end facing the C-opening 12, wherein the cutting element 27 can be mounted in said receptacle by means of a linchpin 31. The geometric axis of this linchpin 31 preferably extends in the same direction as the geometric axes of the rollers 18 and of the rocker shafts 21.

The linchpin 31 preferably passes through the cutting element 27 centrally with respect to its longitudinal extent, namely in the region of a mounting opening 32. In this case, the cutting element 27 preferably is also supported on the facing walls of the receptacle 30 along its outer longitudinal edges 33 such that the cutting element preferably is positively mounted in the receptacle 30.

The linchpin 31 is provided with a radial collar 34 in the region of one end, wherein said radial collar is accommodated in an assigned and adapted recess 35 of the displacement part 29 in the mounted position of the cutting element 27 in the receptacle 30. The radial collar 34 may be designed polygonal, e.g. hexagonal, in order to optionally be mounted in the recess 35 of adapted shaped in a rotationally secured manner.

The free end of the linchpin 31 facing away from the radial collar 34 has a smaller diameter than the section passing through the cutting element 27 and freely protrudes in the region of a clearance cut 36 of the displacement part 29 for its actuation.

Furthermore, the linchpin 31 can be displaced in order to release the cutting element 27, for example, by simply exerting pressure in the axial direction of the linchpin. This is possible, in particular, in a deliberately adjusted protruding position of the displacement part 29 according to the illustrations in FIGS. 14 and 15, wherein the linchpin 31 is exposed in the C-opening 12 for its actuation in said protruding position. The protruding position of the displacement part 29 can be reached by actuating a retraction lever 38 that acts upon the displacement part 29.

The cutting element 27 can be removed from the receptacle 30 after the displacement of the linchpin 31 into a position that releases the cutting element 27 or after the removal of the linchpin 31, respectively. In order to simplify the removal of the cutting element 27, it is furthermore preferred to provide a bore-like removal opening 37 between the mounting opening 32 and the respective cutting tip 28, e.g. in order to thread a tool that simplifies the removal through said removal opening.

According to a potential embodiment, the previously removed linchpin 31 may serve as such a tool for removing the cutting element 27 from the receptacle 30, wherein said linchpin may have a pin formation 63, the diameter of which is adapted to the opening diameter of the removal opening 37, on its end facing away from the radial collar 34. Consequently, the blade removal tool advantageously forms part of the pipe cutting device 1 (compare to FIG. 15).

The displacement part 29 extends in the foot part 10 in an elongate and arcuate manner, particularly within an offset part 39 that is designed in a correspondingly adapted elongate and arcuate manner. In this case, the offset part 39 initially and essentially has a tubular design with preferably rectangular cross section in order to accommodate the displacement part 29 in a guided manner. The latter accordingly can be displaced relative to the offset part 39 and the foot part 10 in the longitudinal direction of the displacement part 29, as well as in the longitudinal direction of the offset part 39 and the foot part 10, along a curved path c. A rotationally fixed displacement of the displacement part 29 within the offset part 39 is achieved due to the preferably noncircular cross section of the cavity 49 of the offset part 39 and of the displacement part 29 accommodated therein.

Figure 6:
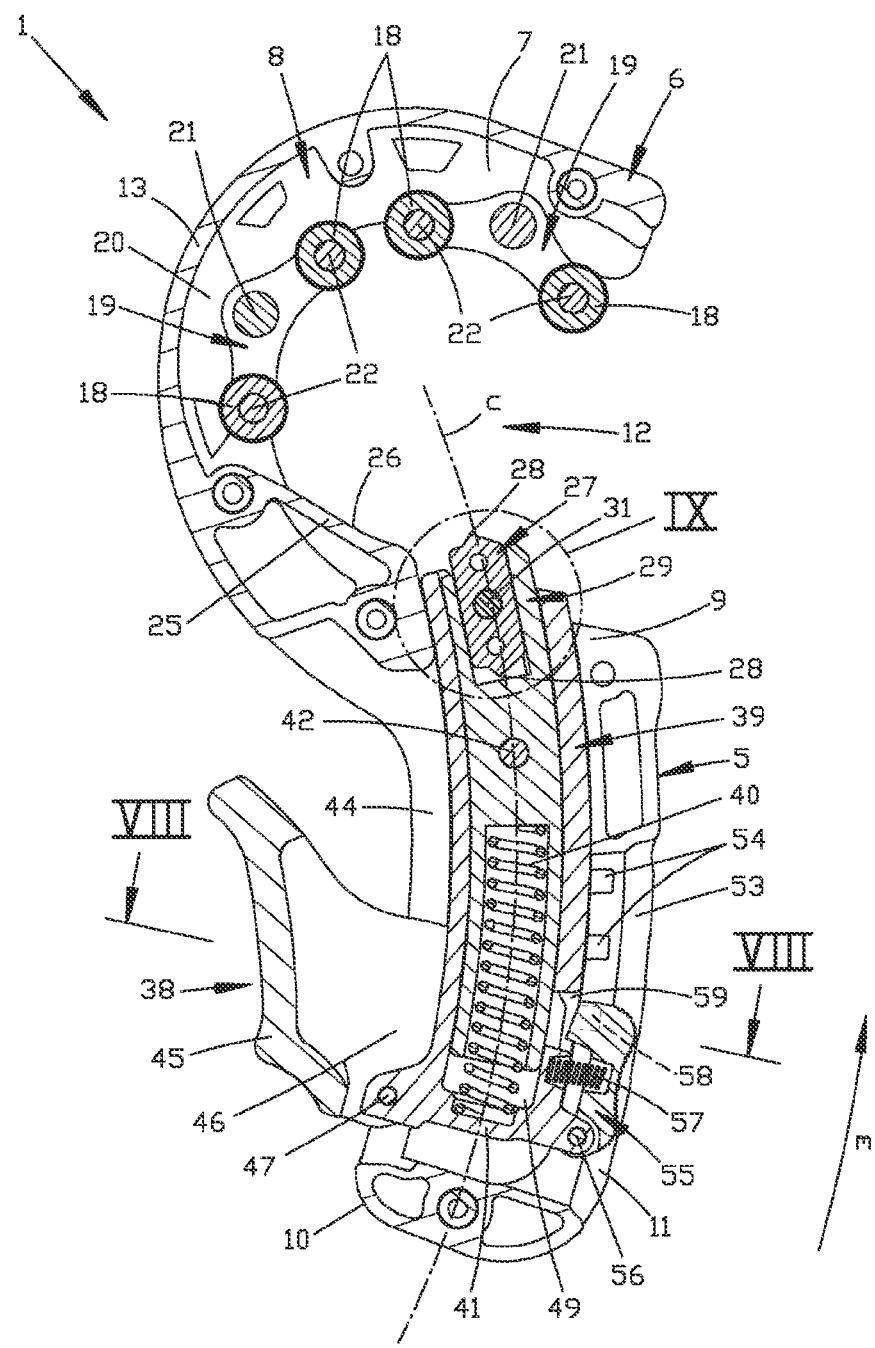
FIG. 6 shows the section along the line VI-VI in FIG. 4.

In this context, it is furthermore preferred that the displacement part 29 is supported within the offset part 39 on a bottom section 41 of the offset part 39 by means of a pressure spring 40 such that the displacement part 29, as well as the cutting element 27 accommodated in the receptacle 30, is pressed into a starting position relative to the offset part 39, e.g. as illustrated in FIG. 6. The cutting element 27 with the respective cutting tip 28 freely protrudes into the C-opening 12 in this starting position.

The displaceability of the displacement part 29 relative to the offset part 39 preferably is limited in both directions. To this end, the displacement part 29 carries a delimiting pin 42, which preferably extends in the axial direction of the rollers 18 and protrudes over the outer wall surface of the displacement part 29 on both sides, in a region between the receptacle 30 and the supporting region for the pressure spring 40, wherein said delimiting pin engages into oblong holes 43 formed in the assigned walls of the displacement part 39 with both ends (compare, for example, to FIG. 7). The oblong holes 43 extend along a curved center line in accordance with the path c.

The aforementioned retraction lever 38 preferably passes through a slot-like through hole 44 of the foot part 10, wherein said through hole 44 preferably is arranged on the side of the foot part 10 lying opposite of the opening region of the C-shaped working head 6.

Starting from an externally accessible actuating section 45, the retraction lever 38 passes through the through hole 44 with two lever limbs 46, which extend parallel to one another and preferably are spaced apart from one another in the direction of the geometric axes of the rollers 18. These lever limbs 46 are fastened on the offset part 39 near the bottom section 41 by means of a shaft 47 such that a pivotable arrangement of the retraction lever 38 as a whole on and relative to the offset part 39 is thereby achieved.

The lever limbs 46 extend beyond the shaft 47 and pass through slots 48 in the wall of the offset part 39 in order to engage into the cavity 49 of the offset part 39, in which the displacement part 29 is guided. In this way, an advantageous guidance of the retraction lever 38 on the offset part 39 can be achieved in the course of an actuation.

Furthermore, the displacement part 29 preferably has control cams 50 that are integrally formed on both outer wall sides and assigned, in particular, to the end facing away from the receptacle 30, wherein said control cams respectively have an arcuate actuating surface 51 that is directed toward the opposite end. This actuating surface 51 is designed for interacting with a facing control surface 52 of the lever limbs 46 of the retraction lever 38 (compare, for example, to FIG. 7).

Accordingly, a deliberate pivoting movement of the retraction lever 38 in the direction of the foot part 10 makes it possible to cause a displacement of the displacement part 29 within the offset part 39 in the direction of the bottom section 41 of the offset part and against the restoring force of the pressure spring 40 in order to thereby retract, in particular, the end-mounted cutting element 27 into the cavity 49 of the offset part 39. The cutting element 27, particularly the cutting tip 28 provided for carrying out the cutting process, therefore preferably no longer protrudes into the C-opening 12 beyond the opening edge of the offset part 39. This retracted position of the cutting element 27 preferably is the position of the pipe cutting device 1, in which a pipe section 2 is inserted into the C-opening 12 (compare to FIGS. 16, 19 and 22).

This position of the displacement part 29 with the cutting element 27, which is assumed as a result of a corresponding actuation of the retraction lever 38, preferably is stop-limited, particularly due to the abutment of the delimiting pin 42 on the end region of the oblong hole 43 facing away from the C-opening 12.

Figure 7:
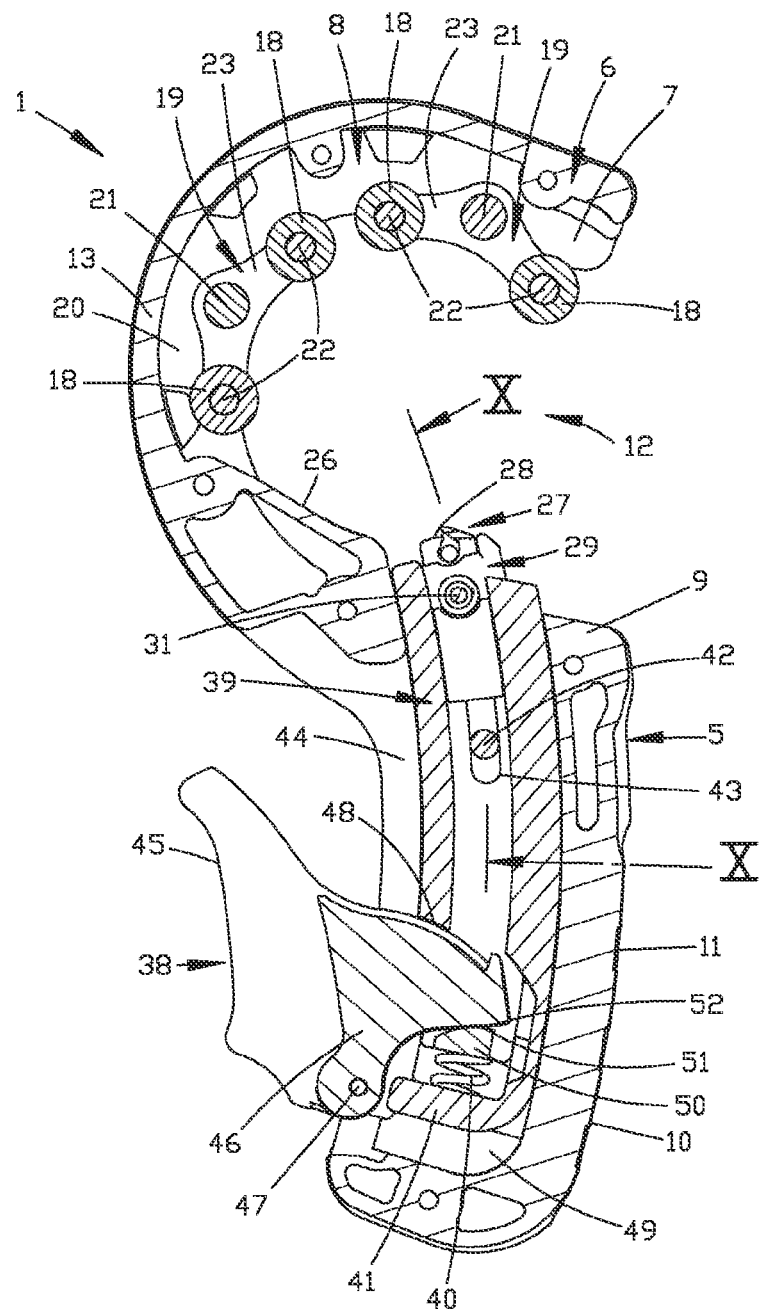
FIG. 7 shows the section along the line VII-VII in FIG. 3.
Figure 8:
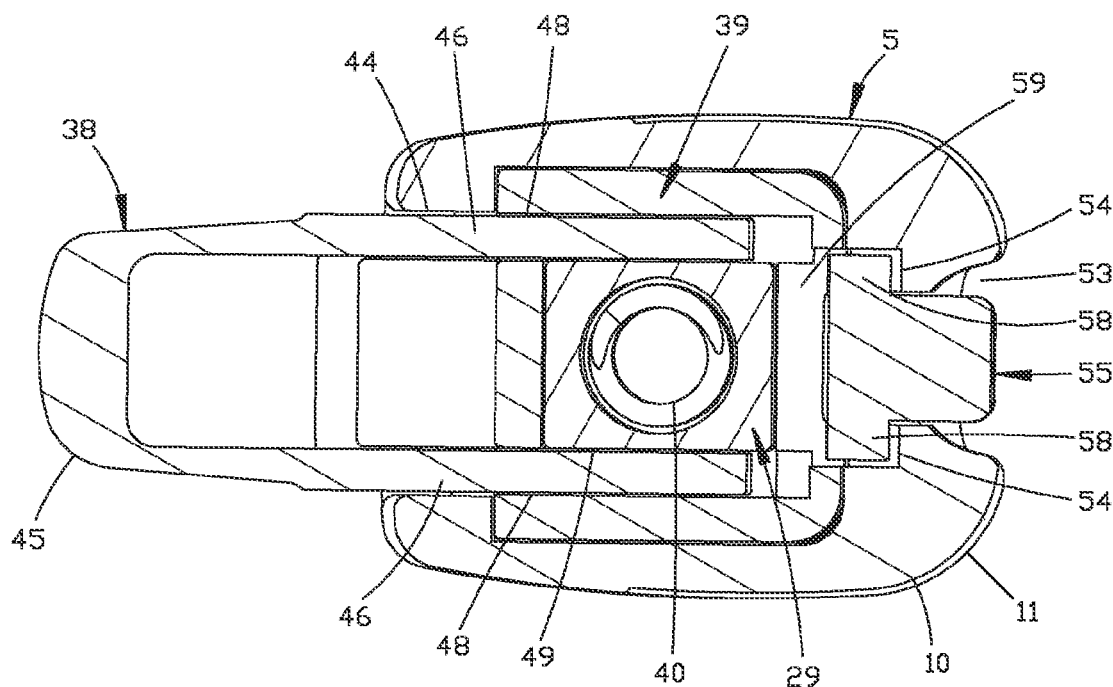
FIG. 8 shows the section along the line VIII-VIII in FIG. 6.

After the cancellation of the force acting upon the retraction lever 38, the displacement part 29 with the cutting element 27 automatically returns into the above-described starting position, e.g. according to FIG. 7, as a result of the relaxation of the previously compressed pressure spring 40.

The displacement part 29 with the cutting element 27 can be displaced into the above-described protruding position of the cutting element 27, in which the linchpin 31 is exposed for a blade change (compare to FIGS. 14 and 15), either automatically as a result of the relaxation of the pressure spring 40 or due to a potential pulling actuation of the retraction lever 38 opposite to the above-described actuating direction. Furthermore, this position of the displacement part 29 and the cutting element 27 preferably can be the stop-limited starting position.

The displacement part 29 can be displaced within the offset part 39 along the curved path c as described above. Furthermore, the offset part 39 also can be displaced—together with the displacement part 29—in an adjusting direction m along this curved path c in order to adapt the C-opening 12 to different diameters of the pipe sections 2 to be cut. The offset part 39 preferably can be offset in stages. In this context, three offset stages are provided in the exemplary embodiment shown.

Furthermore, a slot-shaped opening 53 preferably is provided in the foot part 10 opposite of the through hole 44. Pocket-like catch receptacles 54 are formed in the region of its opening wall, wherein said catch receptacles lie opposite of one another and are equidistantly spaced apart from one another in the extending direction of the path c. Three catch receptacles 54, which respectively open in the direction of the housing cavity accommodating the offset part 39, are provided on both sides in the opening walls in order to realize the three offset stages provided in the preferred exemplary embodiment.

A button-like offset element 55 furthermore is pivotably fastened on the offset part 39 opposite of the retraction lever 38. This offset element is also pivotably mounted in the region of the bottom section 41 of the offset part 39 by means of a shaft 56 and extends within the slot-like opening 53 of the foot part 10.

The offset element 55 is supported on the offset part 39 by means of a pressure spring 57 such that the pressure spring 57 acts upon the offset element radially outward referred to the shaft 56.

Viewed in the extending direction of the shaft 56, the end of the offset element 55 lying opposite of the connecting region in the region of the shaft 56 is provided with freely protruding catch cams 58 on both sides, wherein the length and/or the cross-sectional design of said catch cams 58 preferably are adapted to the opening cross sections of the catch receptacles 54.

The catch cams 58 are moved out of engagement with the catch receptacles 54 on the side of the housing as a result of a purposefully exerted pressure upon the offset element 55 against the restoring force of the pressure spring 57 and a corresponding pivoting movement of the offset element 55 about the shaft 56. The catch cams 58 penetrate into a correspondingly positioned recess 59 of the offset part 39 together with the section of the offset element 55 carrying the catch cams 58. The offset part 39 can be offset along the curved path c in this disengaged position of the offset element 55. In this case, the offset element 55, as well as the opposing retraction lever 38, is displaced together with the offset part 39.

The catch position for securing the new offset position of the offset part 39 together with the displacement part 29 and the cutting element 27 essentially can be realized automatically after canceling the pressure exerted upon the offset element 55. The pressure exerted upon the offset element 55 can be canceled after disengaging the catch position and initiating the displacement of the offset part 39 such that, upon reaching the next catch receptacle 54, the catch cams 58 can automatically drop into the catch receptacle 54 as a result of the relaxation of the pressure spring 57.

Markings 60 may be provided, for example, on the outer wall side of the offset part 39 in order to indicate the respectively adjusted offset position and therefore preferably also the size of the opening for a pipe section 2 to be cut, e.g. when a respective marking lines up with the limb wall 44 of the C-opening 12.

The described pipe cutting device 1 serves, for example, for cutting pipe sections 2 of three different sizes or diameters.

Figure 16:
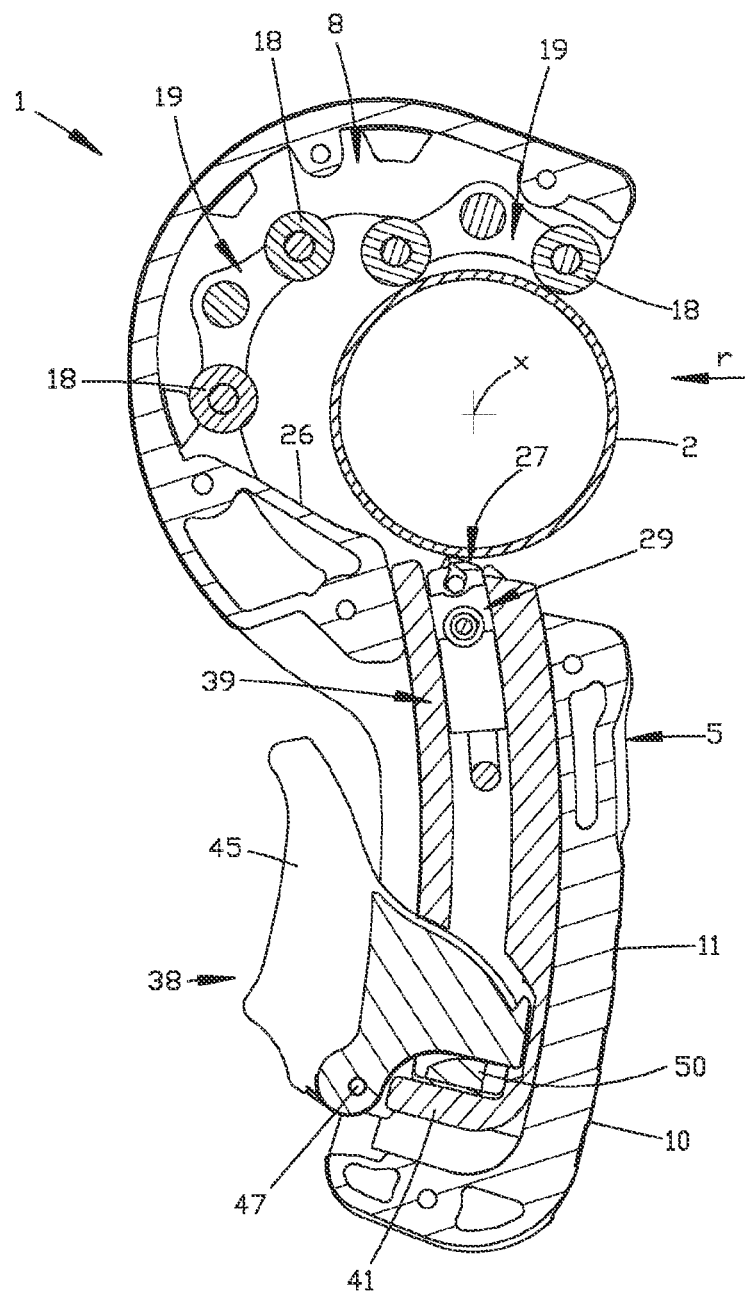
FIG. 16 shows a sectional representation of the pipe cutting device according to FIG. 13 concerning a pipe locating position when a first pipe cutting size is adjusted and the cutting element is displaced into a retracted position.

For example, a first offset position, in which the offset part 39 is almost completely retracted into the foot part 10, may serve for cutting pipe sections 20 with an exemplary diameter of 50 mm. FIG. 16 shows an intermediate position in the course of the insertion of the pipe section 2 to be cut into the C-opening 12 in this first offset position. Due to the retracted cutting element 27, the pipe section 2 can be inserted into the C-opening 12, namely into a cutting standby position of the type illustrated in FIG. 17, without being damaged. The pipe section 2 is circumferentially supported on the rollers 18 of both rocker parts 19, as well as on the supporting surface 26 of the supporting block 25 on the side of the housing. The retraction lever 38 preferably is not subjected to a load in this position such that the cutting element 27 is moved against the outer surface of the pipe section 2 to be cut by means of the displacement part 29 due to the relaxation of the pressure spring 40.

The positioning of the pipe section 2, particularly the positioning of the desired plane of separation of the pipe section 2, is also simplified by the grooves 24 provided in the rollers 18. These grooves 24, as well as the cutting tip 28 of the cutting element 27, preferably extend in a common cutting plane E that is directed transverse to the alignment of the geometric axes of the rollers 18.

Figure 27:
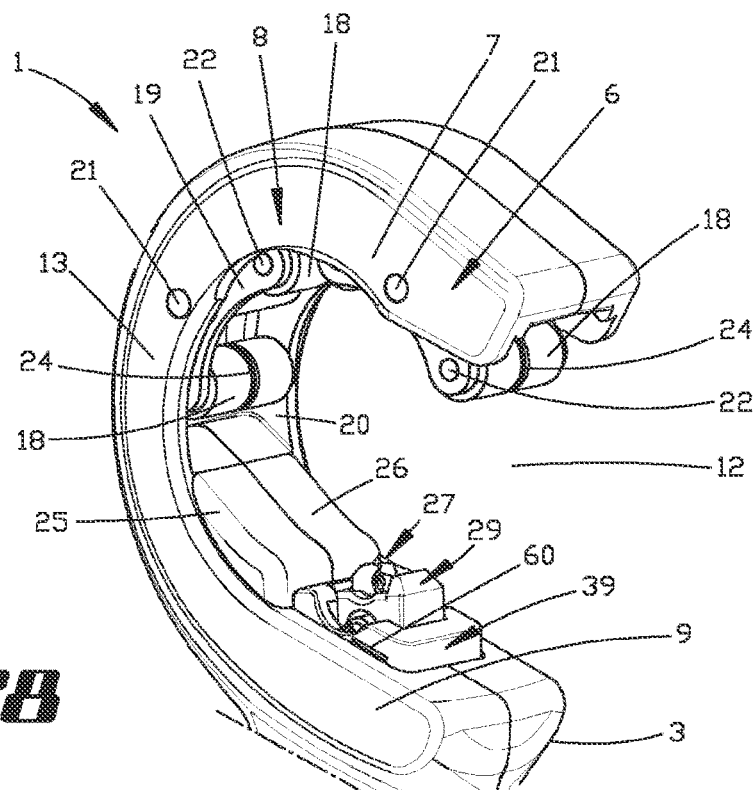
FIG. 27 shows a detailed perspective view of the pipe cutting device concerning another embodiment.
Figure 28:
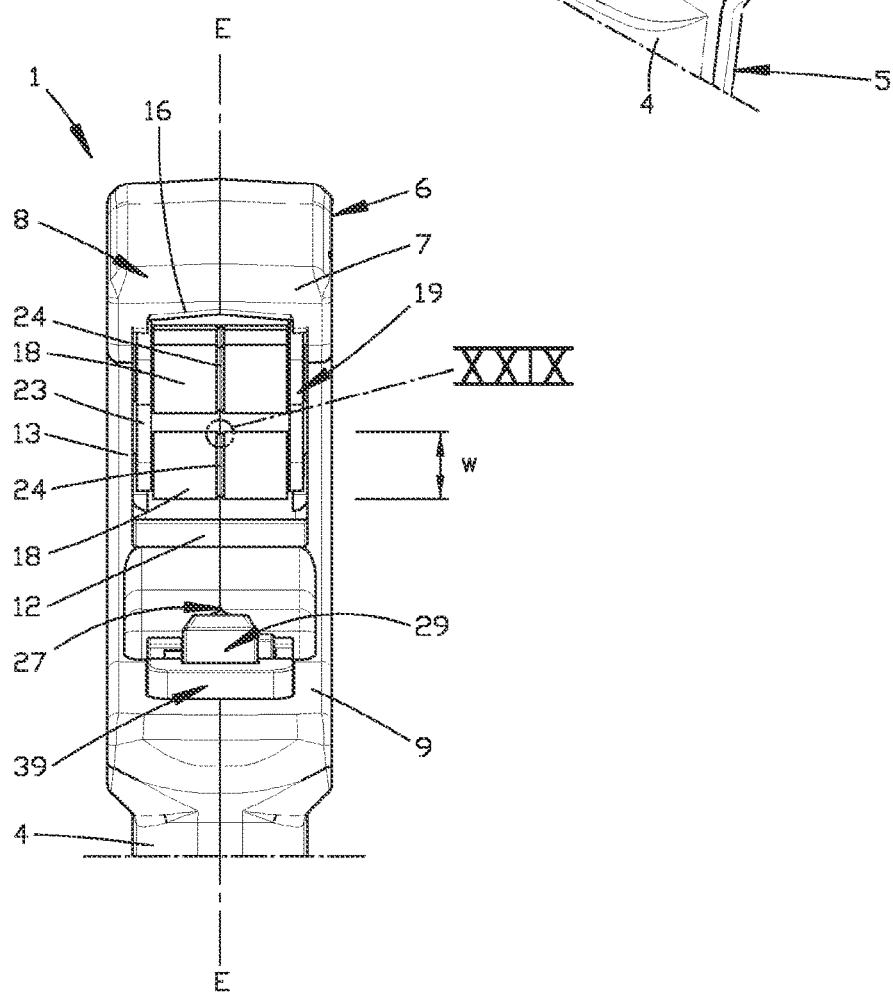
FIG. 28 shows a front view of the pipe cutting device according to FIG. 27.
Figure 29:
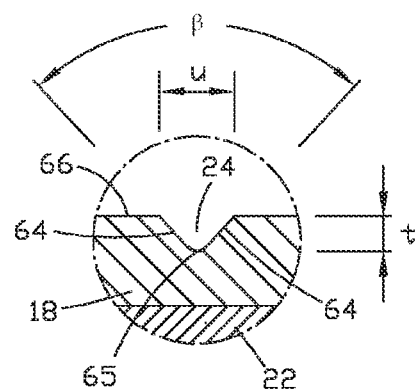
FIG. 29 shows a highly enlarged sectional representation of the region XXIX in FIG. 28.

In a longitudinal section through the roller 18, in which the geometric rotational axis of the roller 18 is illustrated in the form of a line, each groove 24 may be realized in the form of an essentially V-shaped notch as illustrated in FIGS. 27 to 29, wherein said notch preferably is formed centrally with respect to the longitudinal extent of the roller 18 viewed in the axial direction.

The groove 24 that interrupts the rollers surface 66 may have a width u viewed in this longitudinal direction, wherein said groove width may approximately correspond to one eighth to one sixth of the outer roller diameter w (compare to FIG. 29). Furthermore, the groove depth t viewed perpendicular to the roller width u essentially may correspond to one twenty-fourth to one fifth of the outer roller diameter w.

Furthermore, the groove 24 preferably has a V-shape in the longitudinal section according to FIG. 29. In this longitudinal section, the groove walls 64 that delimit the groove 24 essentially transverse to the alignment of the rotational axis may include an angle $\beta$ that preferably amounts to more than 45 degrees and may be as large as 90 or 120 degrees, e.g. an angle of approximately 75 to 105 degrees. Accordingly, these groove walls 64 extend at an incline from a groove base 65, which in the longitudinal section is preferably rounded, in the direction of the outer roller surface while the spacing between the groove walls 64 increases.

As a result of such a design of the rollers 18 with grooves 24 that are aligned in a common cutting plane together with the cutting tip 28, a chip that may be formed, if applicable, on the item to be cut—e.g. a plastic pipe section 2—in the course of the cutting process can be accommodated in one or more of the grooves 24. The chip practically penetrates into the groove 24 of the guiding and supporting roller 18 in the course of the cutting process. The support and guidance of the item to be cut—in this case the pipe section 2—remain unaffected by the potentially formed chip to both sides of the groove 24.

Figure 30:
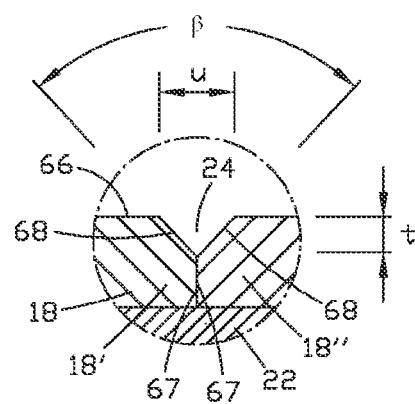
FIG. 30 shows a sectional representation corresponding to FIG. 29, but concerning another embodiment.

FIG. 30 shows another embodiment of a roller 18 that is divided into two parts, namely a first roller part 18' and a second roller part 18", in the extending direction of the roller shaft 22. Both roller parts 18' and 18" preferably can be designed identically and accordingly have the same diameters and longitudinal dimensions.

In the region of an end face 67, each roller part 18' and 18" is provided with an oblique surface 68 that forms a bezel on the radially outer side.

In a normal arrangement, the roller parts 18' and 18" are arranged on the roller shaft 22 in such a way that the end faces 67 with the oblique surfaces 68 face one another and preferably abut on one another as illustrated in FIG. 30. This can be promoted, if applicable, by means of a respective spring element that acts upon the roller part 18' and/or 18" on the axially outer side. In addition, the two roller parts 18' and 18" may be captured between the tabs 23 of the rocker parts 19 in such a way that the roller parts on the roller shaft 22 only have a slight axial play in the range of hundredths to tenths of a millimeter.

The centrally arranged circumferential groove 24 is formed by the facing oblique surfaces 68, wherein the oblique surfaces 68 form the above-described groove walls 64.

The foot part 10 or the handle area 11 respectively is taken hold off on the side facing away from the retraction lever 38. The pipe cutting device 1 is rotated about the pipe section 2 in the direction d, preferably by exerting a tensile load upon this handle section (compare to FIG. 18). In this case, an unintentional actuation of the offset element 55 in the course of the cutting process is prevented due to the recessed arrangement of the offset element 55.

The cutting tip 28, which is subjected to the pressure exerted by the pressure spring 40, buries itself in the wall material of the pipe section 2 due to the resulting pulling movement of the cutting element 27 in the direction d, wherein this ultimately leads to a complete separation of the pipe section 2. The pipe section 2 is supported in a sufficient and friction-reducing manner by means of the rollers 18, as well as by means of the supporting surface 26 (in this offset position), in the course of the entire cutting process.

Figure 19:
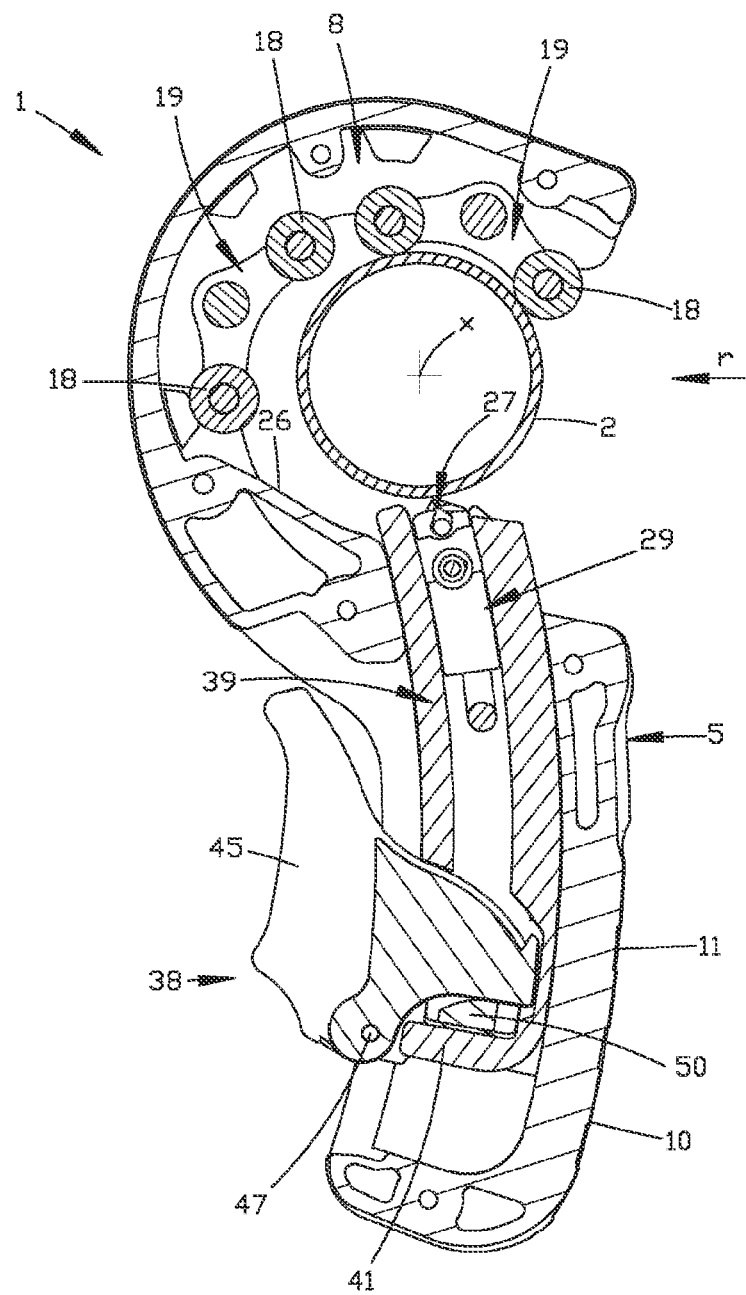
FIG. 19 shows a representation corresponding to FIG. 16, but concerning a second adjusted pipe cutting size and the arrangement of a pipe of corresponding size.
Figure 20:
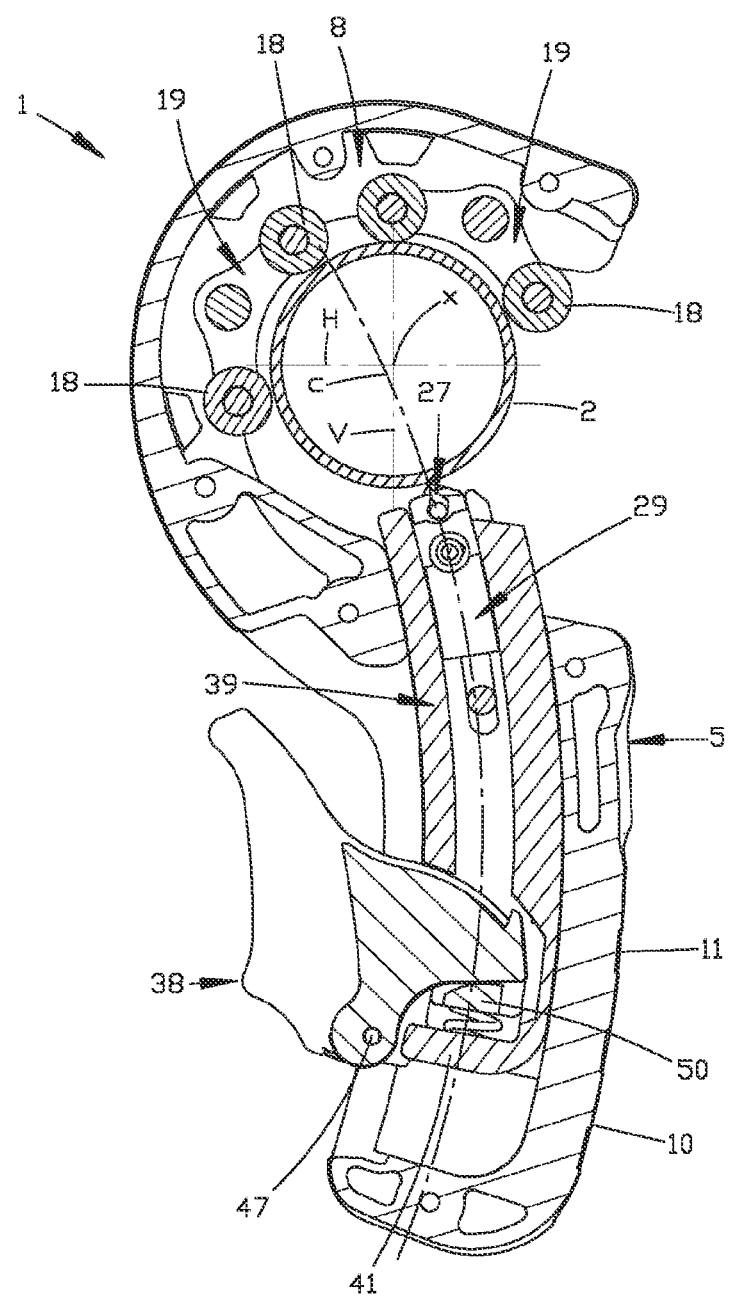
FIG. 20 shows a representation corresponding to FIG. 19, but after the displacement of the pipe to be cut into the cutting position and while the cutting element contacts the pipe.
Figure 21:
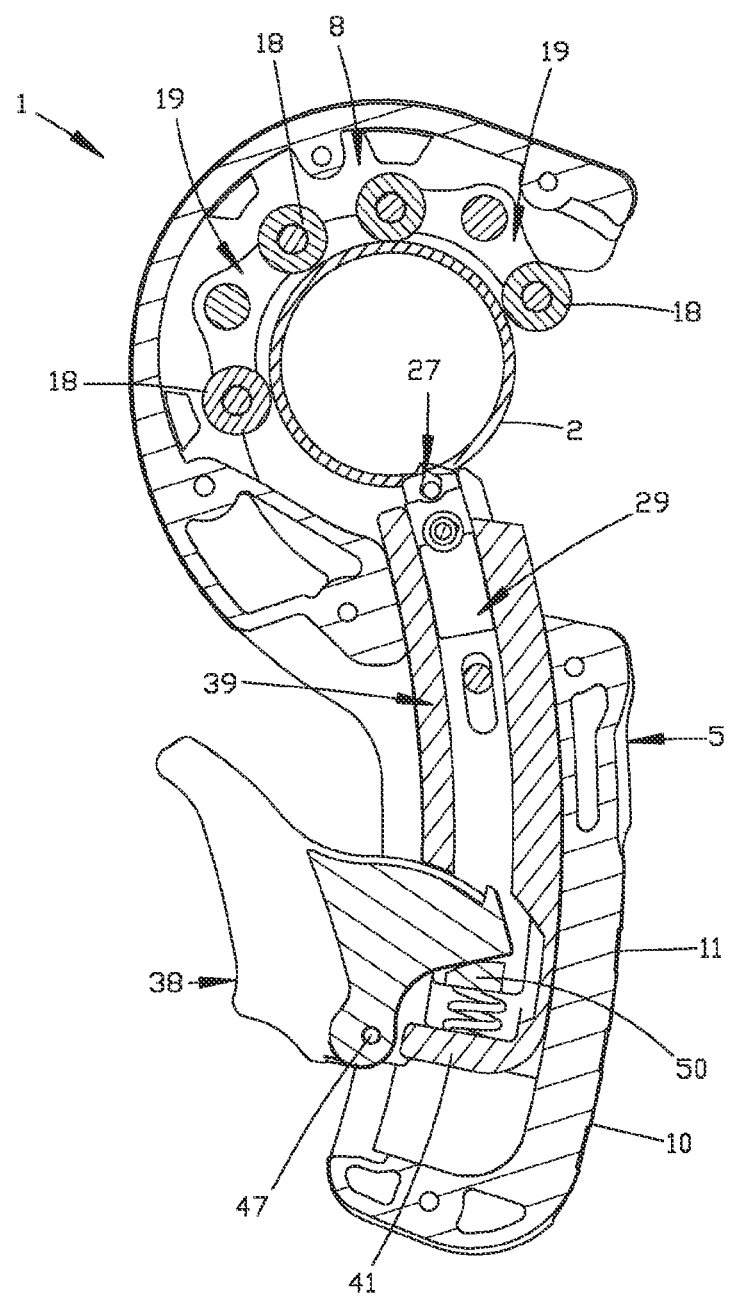
FIG. 21 shows a representation corresponding to FIG. 20 concerning the cutting position of the cutting element.

FIGS. 19 to 21 show the above-described cutting process in a second (central) offset position of the offset part 29, which is adjusted for cutting medium-sized pipe sections 2, e.g. pipe sections 2 with an outside diameter of approximately 40 mm. In the starting position, the offset element 39 with the accommodated displacement part 29 and the cutting element 27 obviously protrudes farther into the C-opening 12 than in the first offset position.

In this case, the pipe section 2 may be circumferentially supported on only the rollers 18 of both rocker parts 19 in the cutting standby position, as well as in the course of the cutting process according to FIG. 21.

Figure 22:
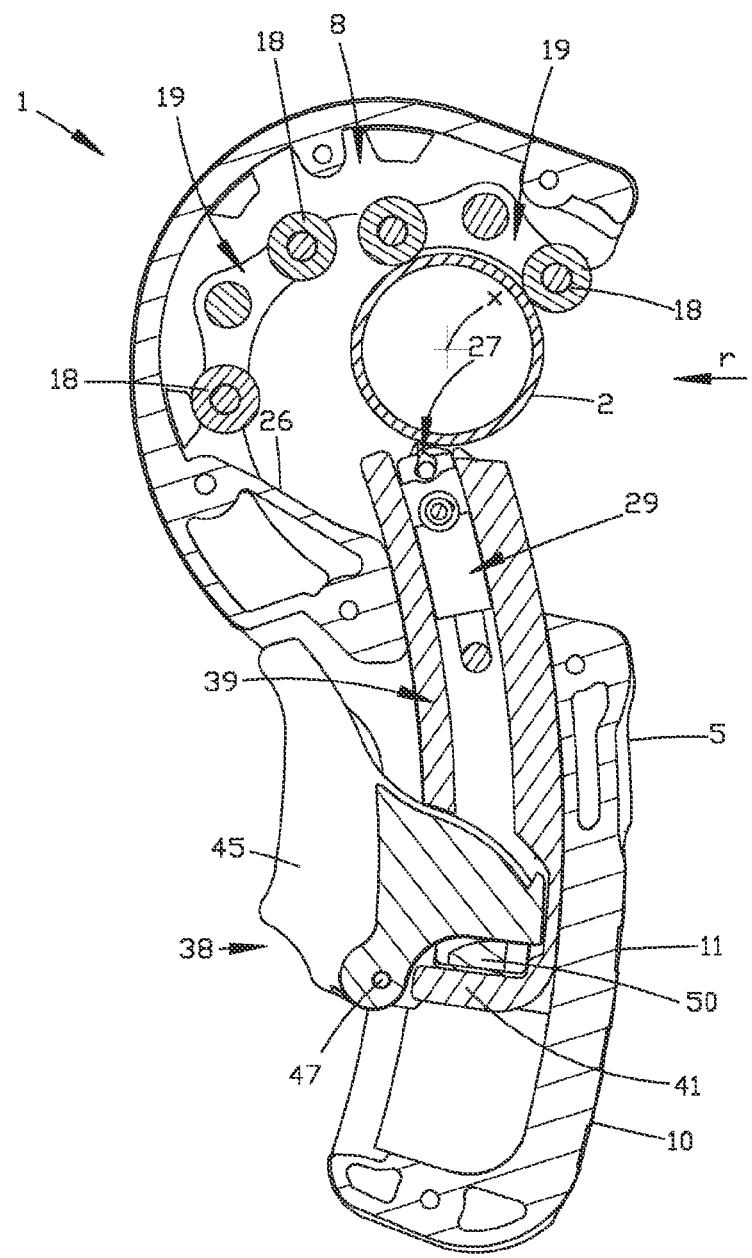
FIG. 22 shows another representation corresponding to FIG. 16, but concerning a third adjusted pipe cutting size and the arrangement of a pipe of corresponding size.
Figure 23:
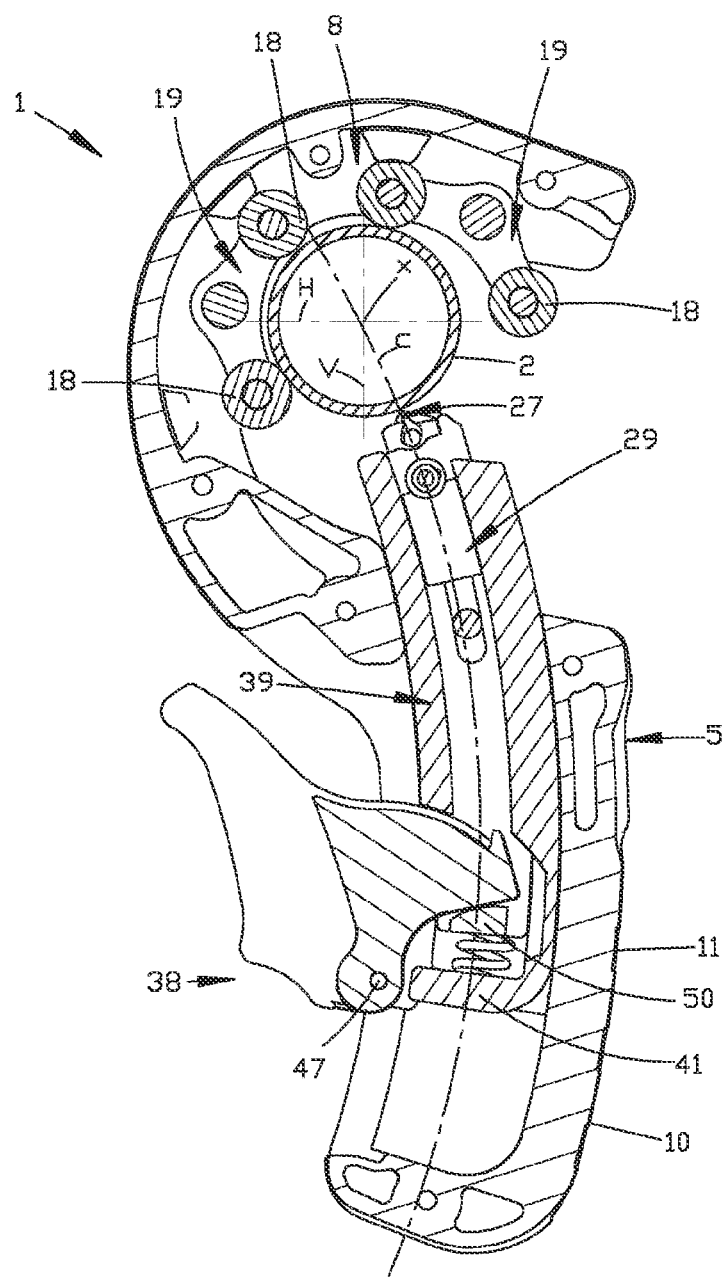
FIG. 23 shows a representation corresponding to FIG. 22, but after the displacement of the pipe to be cut into the cutting position and while the cutting element contacts the pipe.
Figure 24:
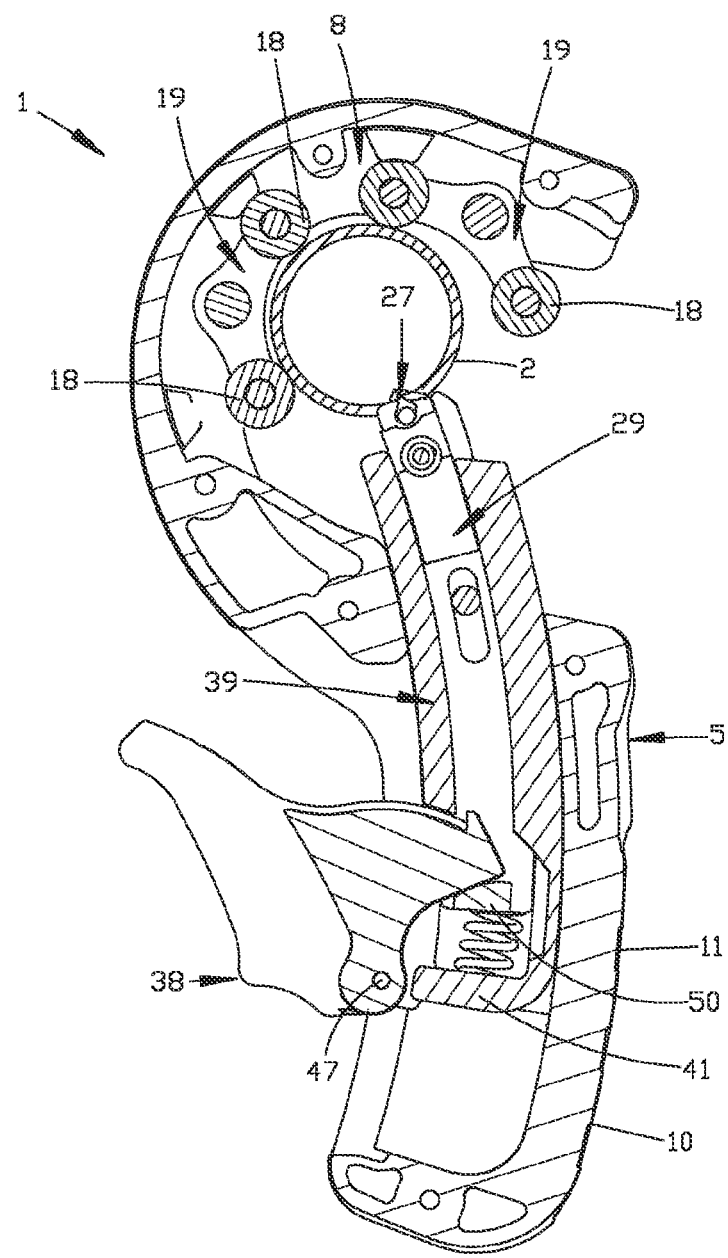
FIG. 24 shows a representation corresponding to FIG. 23 concerning the cutting position of the cutting element.

FIGS. 22 to 24 shows the third offset position of the pipe cutting device 1, in which the offset part 39 with the displacement part 29 and the cutting element 27 protrudes even farther into the C-opening 12. For example, pipe sections 2 with an outside diameter of 32 mm can be cut in this offset position, wherein such a pipe section 2 preferably can be supported on three circumferentially successive rollers 18 in the cutting standby position and during the cutting process.

Figure 17:
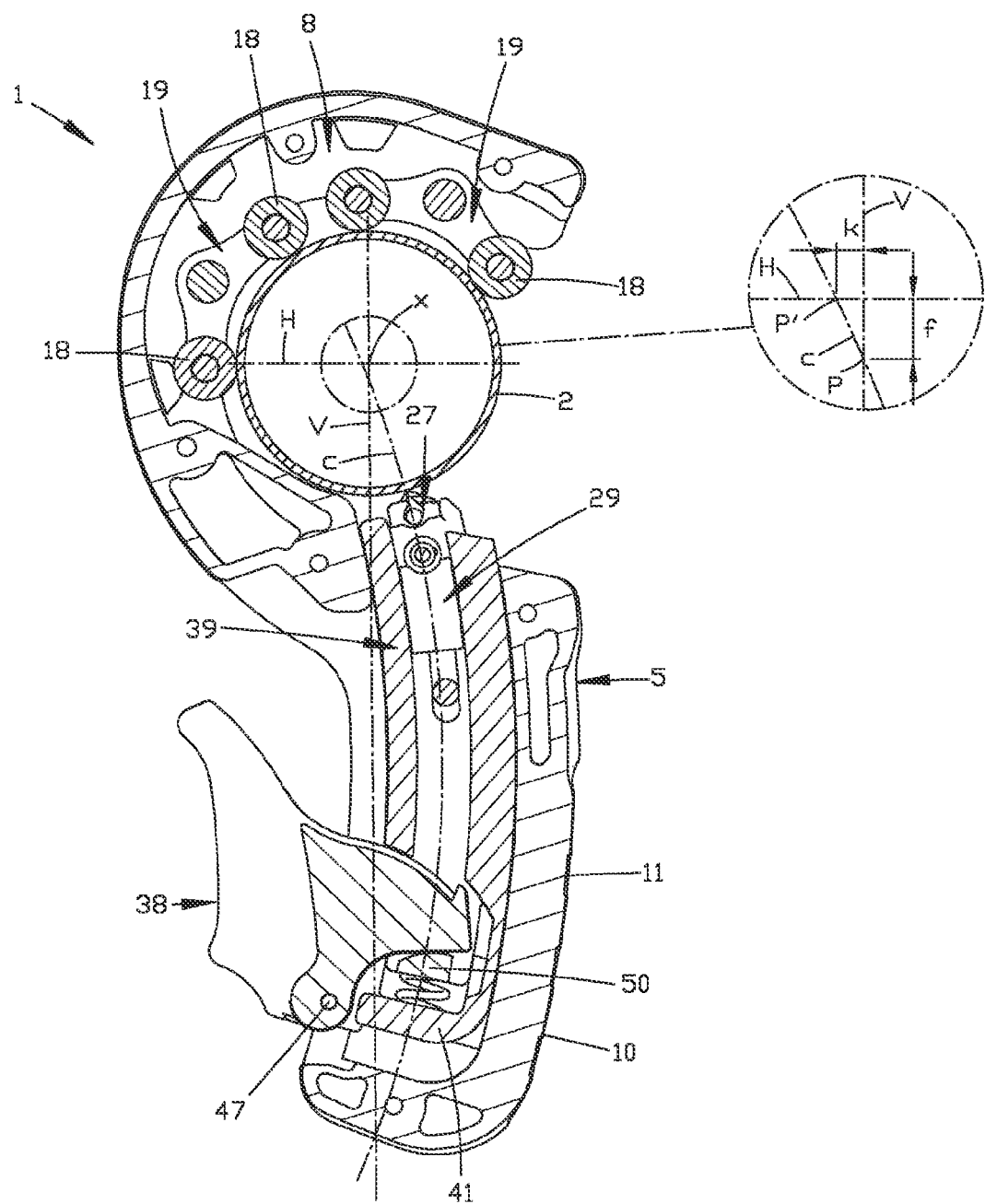
FIG. 17 shows a representation corresponding to FIG. 16, but after the displacement of the pipe to be cut into the cutting position and while the cutting element contacts the pipe.
Figure 18:
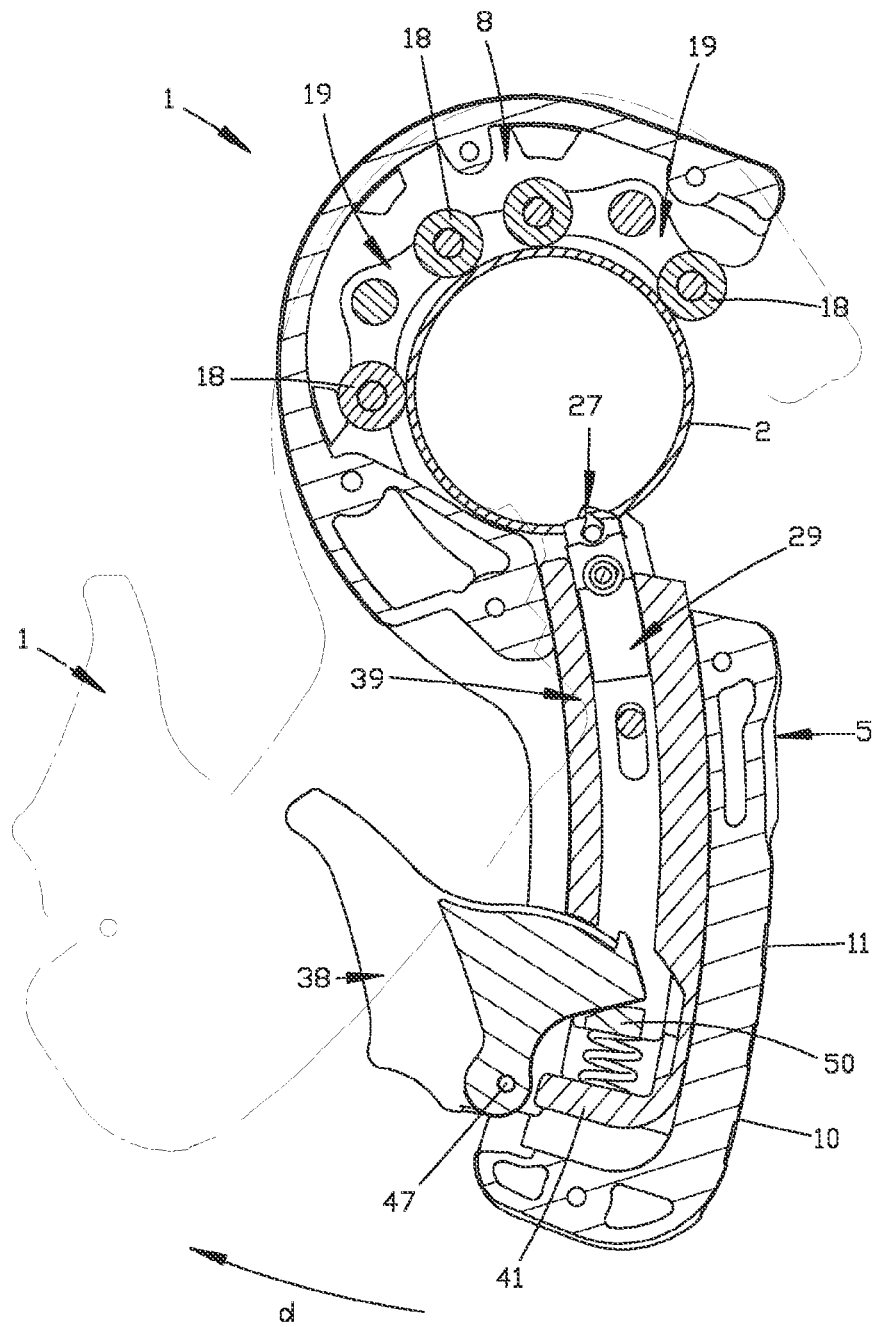
FIG. 18 shows a representation corresponding to FIG. 17 concerning the cutting position of the cutting element.

According to FIGS. 17, 20 and 23, the curved path c essentially is directed toward the pipe axis x of the pipe section 2 in the cutting standby position. If applicable, the path c can exactly intersect the pipe axis x in this case or also extend at a slight distance therefrom.

In an alignment of the pipe cutting device 1, in which an extension of a vertical axis of symmetry V of the pipe section 2 accommodated in the working head 5 passes through the foot part 10 and crosses the curved path c with its end exiting the foot part 10, the path c preferably intersects the vertical axis of symmetry V within the cross section of the pipe section 2 underneath the pipe axis x and the horizontal axis of symmetry H preferably is offset relative to the pipe axis x in the direction of the C-crosspiece 13. In this case, a resulting vertical distance f between the pipe axis x and the intersection point P of the path c with the vertical axis of symmetry V may correspond, for example, to one fifth or less, preferably to one tenth or less and up to one twentieth or less, of the outside diameter g of the pipe section 2. The horizontal distance k between the intersection point P' of the path c with the horizontal axis of symmetry H may correspond, for example, to approximately 0.2-times to 1-time, furthermore to approximately 0.5-times to 0.8-times, the distance f.

Figure 26:
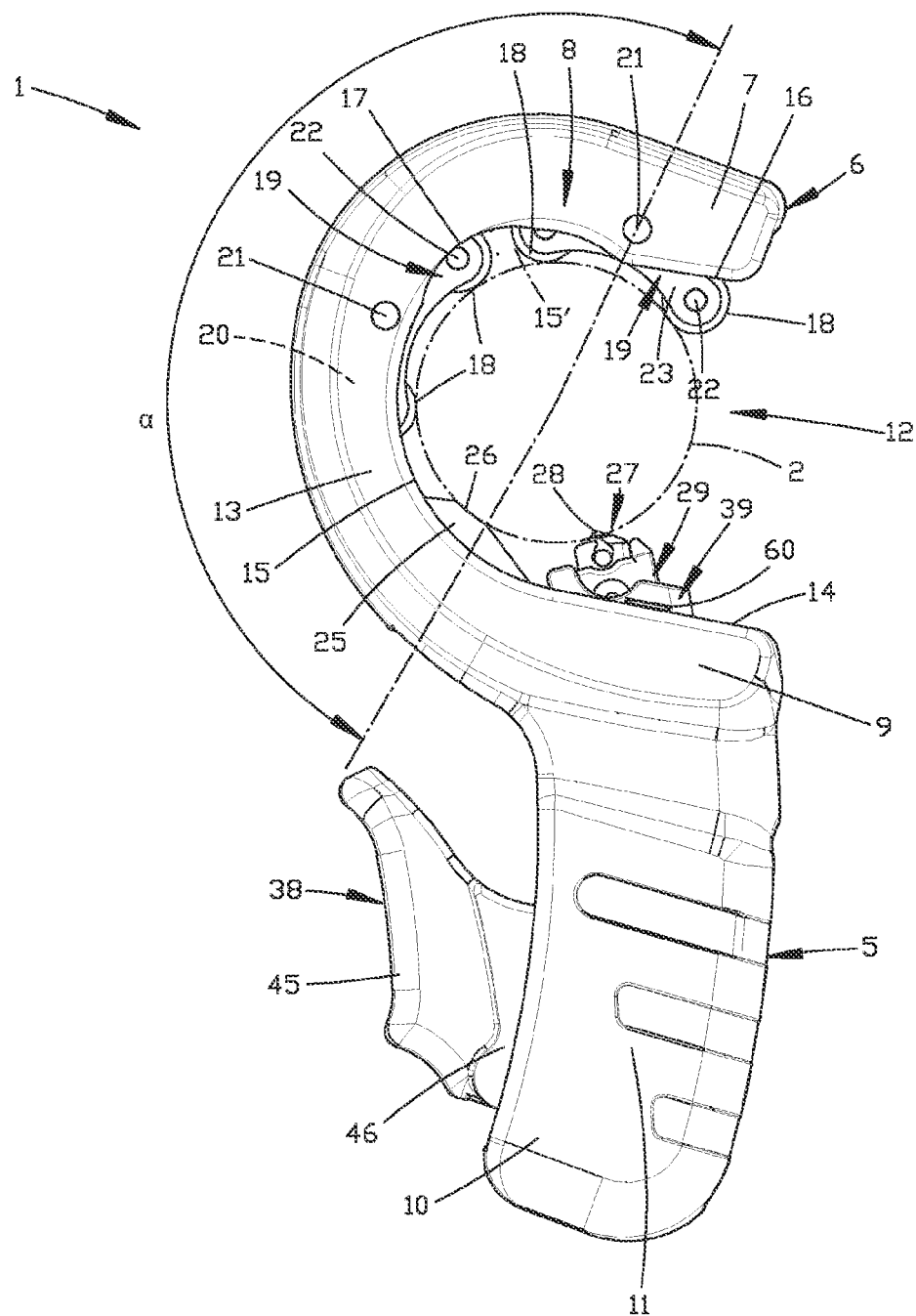
FIG. 26 shows a third embodiment of the pipe cutting device in the form of a representation according to FIG. 2.

Such a supporting angle $\alpha$ of less than 180 degrees can even be achieved with a large-diameter pipe section 2, e.g. a pipe section 2 with a diameter d of approximately 50 mm, e.g. by correspondingly adapting the supporting surface 26 of the supporting block 25. FIG. 26 shows an embodiment of the pipe cutting device 1, in which the supporting surface 26 is circumferentially shortened in comparison with the embodiment according to FIG. 2 and said supporting surface extends along an arcuate line in the illustration according to FIG. 26. As a result, a pipe section 2 with the greatest diameter d possible (in this case, for example, 50 mm) is supported on the supporting surface 26 and the rocker shafts 21 of the working head 6. The supporting angle $\alpha$ resulting between the rocker shaft 21 of the rocker part 19 facing away from the C-crosspiece 13 of the working head 6 and the supporting point on the supporting surface 16 may amount, for example, to approximately 150 to 179 degrees, furthermore to approximately 175 degrees. Undesirable jamming or clamping of the pipe section 2, particularly in the course or at the end of a cutting process, is counteracted as a result of the chosen supporting angle $\alpha$ of less than 180 degrees.

In the cutting standby position of the respective pipe section 2 to be cut, the pipe section 2 is directly or indirectly supported on the working head 6—referred to the pipe axis x—over a supporting angle $\alpha$, which according to the illustrations in FIGS. 20 and 23 preferably (also) amounts to less than 180 degrees for small and medium pipe diameters d, e.g. to approximately 75 to 150 degrees, furthermore to approximately 90 or 135 degrees. The above-described supporting angle $\alpha$ preferably refers to the direct supporting points in the working head 6, furthermore preferably to the support of the pipe section 2 on the supporting block 25 of the working head 6 and/or to the support on one or both rocker shafts 21 (compare to FIG. 26).

According to the embodiment illustrated in FIG. 2, there is no risk of clamping the pipe section 2 in the working head 6 even if the supporting angle $\alpha$ amounts to more than 180 degrees (e.g. to approximately 190 degrees for a pipe section 2 with the same diameter d of approximately 50 mm)

because the pipe axis x and therefore the center point of the pipe lies outside (in front of) the shell-like support in the cutting standby position (see vertical projection of the pipe axis x along the vertical V in FIG. 17).

The preceding explanations serve for elucidating all inventions that are included in this application and respectively enhance the prior art independently with at least the following combinations of characteristics, wherein two, multiple or all of these combinations of characteristics may also be combined with one another, namely:

A pipe cutting device, which is characterized in that the displacement part 29 with the cutting element 27 is movably arranged in an offset part 39 and/or in that the counter-holder 8 has rollers 18 and two rollers 18 respectively are arranged in pairs on a rocker part 19.

A pipe cutting device, which is characterized in that the roller 18 has a groove 24 that circumferentially extends transverse to the roller shaft 22 and interrupts the roller surface 66.

A pipe cutting device, which is characterized in that the offset part 39 can be offset along a curved path c and/or in that an offset element 55 of the offset part 39 is arranged in the handle area 11 in a recessed manner.

A pipe cutting device, which is characterized in that the displacement part 29 with the cutting element 27 is arranged in the offset part 39 so as to be movable against a spring force.

A pipe cutting device, which is characterized in that two pairs of rollers 18 are provided.

A pipe cutting device, which is characterized in that the offset element 55 is arranged so as to be displaceable together with the offset part 39.

A pipe cutting device, which is characterized in that a retraction lever 38 is provided, by means of which the cutting element 27 can be moved out of the C-opening 12, wherein the retraction lever 38 preferably is arranged so as to be displaceable together with the offset part 39 and/or an actuating surface 51, which can be acted upon by the retraction lever 38, preferably is formed on the displacement part 29, and wherein the actuating surface 51 preferably acts as a control cam 50 that moves the displacement part 29 with the cutting element 27 back into a starting position as the spring 40 relaxes.

A pipe cutting device, which is characterized in that the displacement part 29 is designed so as to extend in a curved manner in the adjusting direction m of the offset part 39.

A pipe cutting device, which is characterized in that the retraction lever 38 can respectively act upon an actuating surface 51 with two lever limbs 46 that are spaced apart from one another, wherein the retraction lever 38 preferably is hinged on the offset part 39, and wherein a lever limb 46 preferably passes through a slot 48 of the offset part 39.

A pipe cutting device, which is characterized in that the cutting element 27 is held by a linchpin 31, which can only be removed by exerting pressure in the axial direction of the linchpin 31.

A pipe cutting device, which is characterized in that the cutting element 27 is accommodated in the displacement part 29 so as to be rotatable by 180 degrees.

A pipe cutting device, which is characterized in that the groove 24 in the roller surface 66 has a width u, which viewed in the extending direction of the roller shaft 22 corresponds to one eighth to one sixth of the roller diameter w.

A pipe cutting device, which is characterized in that the groove depth t viewed perpendicular to the groove width u corresponds to one twenty-fourth to one fifth of the roller diameter w.

A pipe cutting device, which is characterized in that the groove 24 is formed centrally of the roller 18 referred to the extending direction of the roller shaft 22.

A pipe cutting device, which is characterized in that the groove 24 and a cutting tip 28 of the cutting element 27 are arranged in a common cutting plane E.

A pipe cutting device, which is characterized in that the roller 18 has a two-part design with a first roller part 18' and a second roller part 18".

A pipe cutting device, which is characterized in that the roller parts 18' and 18" abut on one another with facing end faces, and in that an oblique surface 68 is formed on the radially outer side of one or both end faces 67 in order to form the groove 24.

A pipe cutting device, which is characterized in that the pipe cutting device 1 comprises multiple rollers 18, and in that one or more of the rollers 18 are provided with a groove 24.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Pipe cutting device
2 Pipe section
3 Housing shell
4 Housing shell
5 Housing
6 Working head
7 C-limb
8 Counter-Holder
9 C-limb
10 Foot part
11 Handle area
12 C-opening
13 C-crosspiece
14 Limb wall
15 Crosspiece wall section
15' Extension
16 Limb wall
17 Crosspiece wall section
18 Roller
18' Roller part
18" Roller part 19 Rocker part
20 Housing depression
21 Rocker shaft
22 Roller shaft
23 Tab
24 Groove
25 Supporting block
26 Supporting surface
27 Cutting element
28 Cutting tip
29 Displacement part
30 Receptacle
31 Linchpin
32 Mounting opening
33 Outer longitudinal edge
34 Radial collar
35 Recess
36 Clearance cut
37 Removal opening
38 Retraction lever
39 Offset part
40 Pressure spring
41 Bottom section
42 Delimiting pin
43 Oblong hole
44 Through hole
45 Actuating section
46 Lever limb
47 Shaft
48 Slot
49 Cavity
50 Control cam
51 Actuating surface
52 Control surface
53 Opening
54 Catch receptacle
55 Offset element
56 Shaft
57 Pressure spring
58 Catch cam
59 Recess
60 Marking
61 Steep flank
62 Flat flank
63 Pin formation
64 Groove wall
65 Groove base
66 Roller surface
67 End face
68 Oblique surface
a Expansion dimension
b Distance dimension
c Path
d Direction
f Distance
g Diameter
k Distance
m Adjusting direction
r Inserting direction
s Cutting direction
t Groove depth
u Groove width
w Roller diameter
x Pipe axis
E Cutting plane
H Horizontal axis of symmetry
P Intersection point
P' Intersection point
V Vertical axis of symmetry
α Supporting angle
β Groove opening angle

The invention claimed is:

1. A pipe cutting device (1) comprising: an offset part (39) and a counter-holder (8), which are formed on a C-shaped working head (6), wherein the working head (6) furthermore transforms into a foot part (10), which is configured to be used as a handle area (11), and the offset part (39) is configured to be offset relative to the foot part (10) in order to change an opening width of the working head (6), and wherein the offset part (39) comprises a cutting element (27), wherein the cutting element (27) is accommodated in a displacement part (29) and the displacement part (29) with the cutting element (27) is arranged in the offset part (39) so as to be movable along a curved path (c).

2. The pipe cutting device according to claim 1, wherein the displacement part (29) with the cutting element (27) is movable against a spring force of a spring (40).

3. The pipe cutting device according to claim 2, wherein a retraction lever (38) is provided, by means of which the cutting element (27) can be moved out of the C-opening (12), wherein a retraction lever (38) is arranged so as to be displaceable together with the offset part (39) and/or an actuating surface (51), which is configured to be acted upon by the retraction lever (38), is formed on the displacement part (29), and wherein the actuating surface (51) acts as a control cam (50) that moves the displacement part (29) with the cutting element (27) back into a starting position as the spring (40) relaxes.

4. The pipe cutting device according to claim 3, wherein the retraction lever (38) is configured to act upon the actuating surface (51) with two lever limbs (46) that are spaced apart from one another, wherein the retraction lever (38) is hinged on the offset part (39), and wherein one of the lever limbs (46) passes through a slot (48) of the offset part (39).

5. The pipe cutting device according to claim 1, wherein the counter-holder (8) has rollers (18) and two of the rollers (18) respectively are arranged in a pair on a rocker part (19), and wherein two pairs of rollers (18) are provided.

6. The pipe cutting device according to claim 1, wherein an offset element (55) is arranged in the handle area (11) in a recessed manner, and wherein the offset element (55) is arranged so as to be displaceable together with the offset part (39).

7. The pipe cutting device according to claim 1, wherein the cutting element is accommodated in a displacement part (29) and the displacement part (29) is designed so as to extend in a curved manner in an adjusting direction (m) of the offset part (39).

8. The pipe cutting device according to claim 1, wherein the cutting element (27) is held by a linchpin (31), which can only be removed by exerting pressure in the axial direction of the linchpin (31), and/or wherein the cutting element (27) is accommodated in a displacement part (29) so as to be rotatable by 180 degrees.

9. The pipe cutting device according to claim 1, wherein the counter-holder (8) comprises a roller (18), which has an outer roller surface (66) and is rotatable about a roller shaft (22), wherein the roller (18) has a groove (24) that circumferentially extends transverse to the roller shaft (22) and interrupts the roller surface (66), and wherein the groove (24) in the roller surface (66) has a width (u), which viewed in an extending direction of the roller shaft (22) corresponds to one eighth to one sixth of a roller diameter (w).

10. The pipe cutting device according to claim 9, wherein a groove depth (t) viewed perpendicular to the groove width (u) corresponds to one twenty-fourth to one fifth of the roller diameter (w).

11. The pipe cutting device according to claim 3, wherein the counter-holder (8) comprises a roller (18), which has an outer roller surface (66) and is rotatable about a roller shaft (22), wherein the roller (18) has a groove (24) that circumferentially extends transverse to the roller shaft (22) and interrupts the roller surface (66), and wherein the groove (24) is formed centrally of the roller (18) relative to an extending direction of the roller shaft (22).

12. The pipe cutting device according to claim 1, wherein the counter-holder (8) comprises a roller (18), which has an outer roller surface (66) and is rotatable about a roller shaft (22), wherein the roller (18) has a groove (24) that circumferentially extends transverse to the roller shaft (22) and interrupts the roller surface (66), and wherein the groove (24) and a cutting tip (28) of the cutting element (27) are arranged in a common cutting plane (E).

13. The pipe cutting device according to claim 1, wherein the counter-holder (8) comprises a roller (18), which has an outer roller surface (66) and is rotatable about a roller shaft (22), wherein the roller (18) has a groove (24) that circumferentially extends transverse to the roller shaft (22) and interrupts the roller surface (66), and wherein the roller (18) has a two-part design with a first roller part (18') and a second roller part (18").

14. The pipe cutting device according to claim 13, wherein the roller parts (18' and 18") abut on one another with facing end faces, and wherein a radially outer side of one or both end faces (67) has an oblique surface in order to form the groove (24).

15. The pipe cutting device according to claim 1, wherein the pipe cutting device (1) comprises multiple rollers (18), and wherein one or more of the rollers (18) are provided with a groove (24).

* * * * *